US012548935B2

(12) United States Patent
Blankinship et al.

(10) Patent No.: US 12,548,935 B2
(45) Date of Patent: Feb. 10, 2026

(54) CONNECTOR WITH TERMINAL POSITION ASSURANCE

(71) Applicant: J.S.T. Corporation, Farmington Hills, MI (US)

(72) Inventors: Eric Blankinship, Lathrup Village, MI (US); Ping Chen, Novi, MI (US); Gwendolyn Upson, Ypsilanti, MI (US)

(73) Assignee: J.S.T. Corporation, Farmington Hills, MI (US)

( * ) Notice: Subject to any disclaimer, the term of this patent is extended or adjusted under 35 U.S.C. 154(b) by 316 days.

(21) Appl. No.: 18/142,229

(22) Filed: May 2, 2023

(65) Prior Publication Data

US 2024/0372286 A1 Nov. 7, 2024

(51) Int. Cl.
*H01R 13/424* (2006.01)
*H01R 13/627* (2006.01)
*H01R 13/642* (2006.01)

(52) U.S. Cl.
CPC ....... *H01R 13/424* (2013.01); *H01R 13/6272* (2013.01); *H01R 13/642* (2013.01)

(58) Field of Classification Search
CPC . H01R 13/424; H01R 13/6272; H01R 13/642
USPC .......................................................... 439/345
See application file for complete search history.

(56) References Cited

U.S. PATENT DOCUMENTS

2006/0046581 A1* 3/2006 Okamoto ........... H01R 13/4362 439/752
2019/0006781 A1 1/2019 Hung et al.
2022/0285875 A1* 9/2022 Blankinship ....... H01R 13/4362
2024/0364033 A1* 10/2024 Blankinship ......... H01R 12/724

FOREIGN PATENT DOCUMENTS

EP 3316409 A1 5/2018

OTHER PUBLICATIONS

European Application No. 24172558.9, European Search Report mailed Oct. 9, 2024; 7 pages.

* cited by examiner

*Primary Examiner* — Tulsidas C Patel
(74) *Attorney, Agent, or Firm* — Sterne, Kessler, Goldstein & Fox P.L.L.C.

(57) ABSTRACT

An electrical connector is provided. The electrical connector can include a female housing and a terminal position assurance member forming a pre-installed assembly. The terminal position assurance member can include one or more lock arms to retain the terminal position assurance member in a final lock position, which can provide reinforcement or secondary locking for a terminal, and terminal position assurance.

19 Claims, 22 Drawing Sheets

10

CONNECTOR WITH TERMINAL POSITION ASSURANCE

FIELD

The present disclosure relates to connectors. In particular, aspects relate to an electrical connector with terminal position assurance.

BACKGROUND

Electrical connectors can be used in various wiring systems. Electrical connectors can include a locking mechanism to maintain coupling between a female housing and a male housing. The female housing can support one or more terminals for mating with one or more male pins supported by the male housing. A terminal position assurance member can be used to assure proper installation and positioning of the terminals in the female housing. The terminal position assurance member can be locked in a position for assuring terminal positioning. Terminal position assurance members can be inserted into the female housing, and a portion of the terminal position assurance member can extend outside of the female housing.

SUMMARY

According to aspects, an electrical connector housing to receive an asymmetrical terminal position assurance member can include a first side, a second side opposing the first side, a first retention aperture to receive a fixed lock arm of the terminal position assurance member, and a first retention wall extending from the first side and adjacent the first retention aperture, the first retention wall comprising a first retention detent and a first locking detent positioned below the first retention detent, the first retention detent and the first locking detent extending outwardly from the first retention wall to retain the fixed lock arm in the first retention aperture.

In an aspect, the electrical connector housing first retention wall can further include an intermediate step between the first retention detent and the first locking detent to receive a first retention detent of the fixed lock arm in a pre-lock position of the terminal position member.

In an aspect, the electrical connector housing first retention wall can further include an intermediate step above the first retention detent to receive a first retention detent of the fixed lock arm in a final lock position of the terminal position member.

In an aspect, the electrical connector housing can include a first row of terminal apertures and a second row of terminal apertures positioned below the first row, the first row and the second row separated by a row axis, and the intermediate step can be positioned above the row axis.

In an aspect, the electrical connector housing first retention detent and the second retention detent can be positioned below the row axis.

In an aspect, the electrical connector housing can include a second retention aperture to receive a cantilevered lock arm of the terminal position assurance member and a second retention wall extending from the second side and adjacent the second retention aperture. In an aspect, the electrical connector housing first retention wall can include a first top edge, the second retention wall can include a second top edge, and the first top edge can be positioned above the second top edge. In another aspect, the electrical connector housing second retention wall can include a second retention detent and a second locking detent positioned below the second retention detent, the second retention detent and the second locking detent extending outwardly from the second retention wall to retain the cantilevered lock arm in the second retention aperture.

According to aspects, a terminal position assurance member can include a front, a rear opposing the front, a side intermediate to the front and the rear, a top end intermediate to the front and the rear, a fixed lock arm to retain the terminal position assurance member in a first retention aperture of an electrical connector housing, the fixed lock arm being fixed at both ends and extending outwardly from the top end, and a cantilevered lock arm to retain the terminal position assurance member in a second retention aperture of the electrical connector housing, the cantilevered lock arm being fixed at one end and extending outwardly from the side such that the terminal position assurance member is asymmetrical.

In an aspect, the terminal position assurance member fixed lock arm can include a first retention detent and a first locking detent positioned below the first retention detent, the first retention detent and the first locking detent can be received by a first retention wall of the electrical connector housing.

In an aspect, the terminal position assurance member fixed lock arm can include a curved top surface.

In an aspect, the terminal position assurance member top surface of the fixed lock arm can be a part of the top end of the terminal position assurance member.

In an aspect, the terminal position assurance member fixed lock arm can extend outwardly from the top end of the terminal position assurance member.

In an aspect, the terminal position assurance member can include a distance from a bottom surface of the terminal position assurance member to the top end of the terminal position assurance member that is less than the distance from the bottom surface of the terminal position assurance member to a top surface of the fixed lock arm.

In an aspect, the terminal position assurance member can include a distance D7 that is the distance from a bottom surface of the terminal position assurance member to the top end of the terminal position assurance member, and a distance D8 that is the distance from the bottom surface of the terminal position assurance member to a top surface of the fixed lock arm. D8 can be greater than D7.

In an aspect, the terminal position assurance member cantilevered lock arm can be deflected inward toward the side of the terminal position assurance member to move between a pre-lock position and a final lock position of the terminal position assurance member.

According to aspects, a method of retaining an terminal position assurance member in an electrical connector can include providing a first row of terminal apertures and a second row of terminal apertures below the first row, the first row and the second row being disposed between a first side and a second side of a housing, the second side opposing the first side, providing an aperture to receive a terminal position assurance member, the aperture extending upward from a bottom of the housing and comprising a first retention aperture intermediate to the first side and the first row and the second row and a second retention aperture intermediate to the second side and the first row and the second row, receiving a fixed lock arm of the terminal position assurance member in the first retention aperture, and receiving a cantilevered lock arm of the terminal position assurance member in the second retention aperture.

In an aspect, the method can include offsetting the first row such that the first row begins at a distance D1 from a first side of the first side of the housing. The distance D1 can be greater than a distance D2 from the first side, where the second row begins at the distance D2.

In an aspect, the electrical connector first row can begin at a distance D3 from a second side of the second side of the housing, the distance D3 can be less than a distance D4 from the second side, the second row beginning at the distance D4.

In an aspect, the first row and the second row can be separated by a row axis. The method can include receiving the fixed lock arm of the terminal position assurance member in the first retention aperture and extending the fixed lock arm above the row axis. Receiving the cantilevered lock arm of the terminal position assurance member in the second retention aperture can include extending the cantilevered lock arm to the row axis.

BRIEF DESCRIPTION OF THE DRAWINGS/FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
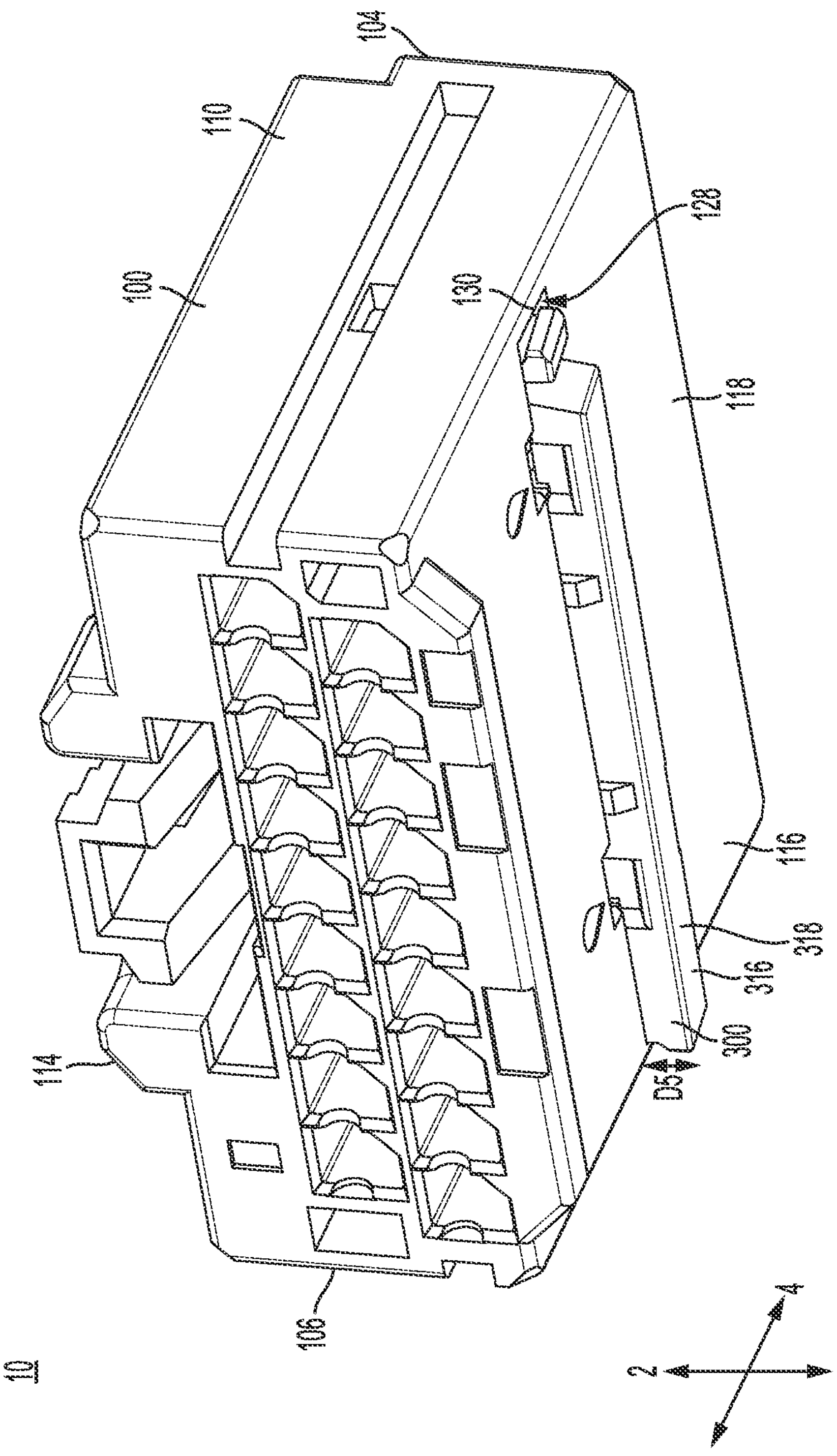
FIG. 1 is a perspective view of a female connector housing and terminal position assurance member according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As used herein, the term "approximately" is inclusive of the number to which it refers and includes numbers that bound and are within a range of 5%, 10%, 15%, or 20% except where such number would exceed 100% of a possible value.

Aspects provide an electrical connector for wiring systems, such as a vehicle wiring system. The electrical connector described herein can have improved terminal position assurance. The improved terminal position assurance can ensure terminal connections and prevent unintended withdrawal.

The electrical connector can include a female housing, a male housing, and a terminal position assurance member ("TPA member"). The female housing and the TPA member can form an assembly that can be coupled to the male housing. The TPA member can maintain proper terminal positioning within the housings. Terminal segments containing wire terminals can include a primary lock to maintain their position in a housing, ensuring proper mating. In an aspect, the TPA member can reinforce the primary lock. In another aspect, a TPA member can be a secondary lock. Advantageously, feedback (e.g., visual, tactile, and/or audible feedback) can be provided to signal that the TPA member is in a final lock position so that a terminal can be installed with terminal position assurance. In the final lock position, the TPA member can be fully within the female housing. In another aspect, a portion of the TPA member can extend outside the female housing. Once the terminal segments are installed, the TPA member can be in a final lock position in which the TPA member can be in blocking engagement with the terminal segments to prevent the terminal segments from being unintentionally removed from the female housing. In another aspect, the electrical connector can support a TPA member that is inserted in the direction of coupling.

The male housing can include a front and a rear. An aperture for receiving the female housing and TPA member assembly can extend from the front to a portion between the front and the rear. The female housing can include a front, a rear, a bottom, and a top. One or more terminal apertures can extend intermediate to a first side and a second side opposing the first side of the female housing. The terminal apertures can extend from the front to the rear of the female housing to receive one or more terminal segments. Another aperture can extend from the bottom to a portion between the bottom and the top of the female housing to receive the TPA member. In this way, the electrical connector can support a TPA member that is inserted in a direction alternative to the direction of coupling between the female housing and the male housing. The aperture in which the TPA member is disposed can intersect the terminal apertures such that the TPA member can support the terminal segments disposed in the terminal apertures.

As described herein, the assembly including the female housing and the TPA member can be pre-installed. Accordingly, a user does not have to couple the TPA member to the female housing. The TPA member can be in a pre-lock position prior to being moved into a position to provide terminal position assurance. In the pre-lock position, a portion of the TPA member can extend outwardly from the bottom of the female housing. In other aspects, the TPA member can be inserted from another side of the female housing, e.g., the front or the rear. In an aspect, the male housing can include an additional TPA member.

In a final lock position, the TPA member can provide terminal position insurance. The TPA member can move to the final lock position where it can be fully within the female housing. In an aspect, the terminal segments can be inserted through the female housing terminal apertures in the pre-lock position. However, the TPA member can be prevented from moving to the final lock position if one or more terminal segments are partially mated. In an aspect, the terminal segments can block the TPA member from being moved to the final lock position if the terminal segments are only partially mated. Thus, in an aspect, for the TPA member to move to the final lock position, the terminal segments must be fully installed. When the terminal segments are fully installed, the terminal segments do not block the TPA member from moving to the final lock position. Accordingly, the terminal segments can be installed while the TPA member is in the pre-lock position. Once the terminal segments are installed, the TPA member can be moved to the final lock position. In an aspect, the terminal segments can be prevented from being inserted through the female housing terminal apertures if the TPA member is in the final lock position.

Because a portion of the TPA member can extend outwardly from the bottom of the female housing in the pre-lock position, the assembly can be prevented from clearing the bottom of the male housing. In this way, the male housing can be prevented from receiving the female housing and TPA member in the pre-lock position to mate the male housing to the female housing. The visible feedback of a portion of the TPA member extending outwardly from the bottom of the female housing can indicate the pre-lock position of the TPA member. Accordingly, the visible feedback can indicate that the TPA member is not in a final lock position to provide terminal position assurance. Once the TPA member is in the final lock position and the TPA member is fully within the female housing, the male housing can receive the assembly. This can provide further assurance that the electrical connector comprises one or more terminal segments installed with position assurance. In addition, the overall size of the electrical connector can be reduced by disposing the entire TPA member within the female housing, for example, so the connector can have a low profile. This is beneficial in vehicle wiring systems, for example, that are complex and require numerous components with high reliability, but space is limited.

The female housing can include one or more retention apertures. The retention apertures can be a part of the aperture in which the TPA member is disposed. Accordingly, the retention apertures can extend upward from the bottom of the housing to a portion between the bottom and the top of the female housing. A first retention aperture can be intermediate to the first side of the female housing and the terminal apertures. A second retention aperture can be intermediate to the second side of the female housing and the terminal apertures.

The terminal apertures can be arranged in one or more rows. As described herein, a first row and a second row of terminal apertures can be provided, the second row being below the first row. In some aspects, the rows of terminal apertures can be aligned such that proximal terminal apertures are arranged in parallel. In some aspects, the rows of terminal apertures can be offset. In some aspects, the first row of terminal apertures can begin at a different distance from the first side of the female housing than the second row of terminal apertures. In some aspects, the first row of terminal apertures can begin at a different distance from the second side of the female housing than the second row of terminal apertures. The offset rows can create space to form the retention apertures. In this way, the retention apertures can fit one or more lock arms of the TPA member.

The lock arms can retain the TPA member in the retention apertures to facilitate terminal position assurance. Moving the lock arms can move the TPA member between a pre-lock position and the final lock position. In some aspects, the TPA member can include one or more cantilevered lock arms having a locking surface from which a retention detent extends outwardly. To retain the TPA member, the retention detent of a cantilevered lock arm can extend into a retention aperture of the female housing and engage with a retention wall of the female housing that can form a boundary of the retention aperture. In an aspect, the retention wall can extend from a side of the female housing.

In some aspects, the TPA member can include one or more fixed lock arms. A fixed lock arm can be fixed on one end at a top of the TPA member and at the other end at a side of the TPA member. A locking surface of the fixed lock arm can extend from the top of the TPA member to the side of the TPA member. Accordingly, the locking surface can include a top edge of the fixed lock arm. The locking surface can also include a retention detent that extends outwardly from the locking surface and engages with a retention wall of the female housing that can form a boundary of the retention aperture.

The TPA member can be prevented from being removed from the female housing aperture because of the interference between the retention walls and the retention detents of the one or more cantilevered lock arms and the one or more fixed lock arms. Pre-installation of the female housing and TPA member assembly can include installing the TPA member to be retained by the female housing in this way. In some aspects, the TPA member can include two lock arms. In some aspects, the TPA member can include one cantilevered lock arm and one fixed lock arm at opposing ends of the TPA member. In some aspects, the locking surface of the cantilevered lock arm can extend from a side of the TPA member. In some aspects, the locking surface of the fixed lock arm can extend from a top of the TPA member. In some aspects, the TPA member can include one cantilevered lock arm and one fixed lock arm, where the cantilevered lock arm and fixed lock arm are different shapes, such that the TPA member is asymmetrical. In some aspects, the TPA member can include two fixed lock arms on both sides. In some aspects, the two lock arms of the TPA member can be symmetrical.

The cantilevered lock arm can additionally include a locking detent that can engage the retention wall of the female housing to move the TPA member fully within the female housing and into the final lock position. To lock the TPA member, the cantilevered lock arm can be deflected inward away from its biased position such that the locking detent can clear a locking detent of the retention wall and the TPA member can be moved into the female housing aperture. Once the TPA member is moved into the female housing aperture, the cantilevered lock arm can be deflected outward to its biased position and the locking detent can join the retention detent in the retention aperture.

The fixed lock arm can also include a locking detent that can engage the retention wall of the female housing to move the TPA member fully within the female housing and into the final lock position. To lock the TPA member, the fixed lock arm can be moved upward such that the retention detent clears a retention detent of the retention wall and the locking detent is interior to the retention wall. Once the TPA member is moved into the female housing aperture, the locking detent of the fixed lock arm can join the retention detent in the retention aperture.

The TPA member can be prevented from moving further into the female housing by the aperture sidewall that receives the TPA member. When both the retention detents and the locking detents of the cantilevered lock arm and the fixed lock arm are disposed in the respective retention apertures, the TPA member can be fully within the female housing and the TPA member can be in the final lock position. In the final lock position, the TPA member can be prevented from being removed from the female housing aperture because of the interference between the locking detents and the retention walls.

The geometry of the retention walls and the lock arms can support movement of the TPA member between the pre-lock position and the final lock position. The retention detents and locking detents of the cantilevered lock arm, the fixed lock arm, and the retention walls can include shaped surfaces (e.g., chamfered, beveled, or curved) to facilitate the locking movement. Similarly, shaped surfaces on the retention detents and locking detents can allow the TPA member to be pulled out of the female housing. This can release the TPA member from the final lock position to facilitate resetting or maintenance.

In some aspects, the overall size of the electrical connector can be reduced by disposing the locking detents within the female housing. Instead of positioning the locking detent outside of or on an exterior surface of the female housing, the locking detents can be within the retention apertures inside the female housing. Accordingly, the connector can have a low profile when the TPA member is in the final lock position. In some aspects, the offset rows can also facilitate limiting the size of the electrical connector. For example, aligning the rows of terminal apertures can require expanding the size of the female housing to accommodate the retention apertures for receiving one or more lock arms of the TPA member. By offsetting the rows, space for the retention apertures can be created within the dimensions of the female housing, negating the need to expand the size of the female housing. The low profile of the connector described herein is beneficial in vehicle wiring systems, for example, that are complex and require numerous components with high reliability, but space is limited.

Audible feedback (e.g., a click sound) can be provided to signal that the TPA member is in the final lock position. In addition, tactile and/or visual feedback can be provided to indicate that the TPA member is in the final lock position. For example, the entire TPA member being within the female housing in the final lock position can provide a visual signal that a terminal is installed with terminal position assurance. By receiving this feedback, the terminal segments can thereafter be installed with assurance that reinforcement/secondary locking will be provided and that terminals will be installed with terminal position assurance.

A pre-installed assembly having a female housing 100 and a TPA member 300 is shown in FIG. 1. TPA member 300 can be partially disposed in female housing 100 such that TPA member 300 can be in a pre-lock position 10. In some aspects, TPA member 300 can be entirely disposed in female housing 100.

Figure 2:
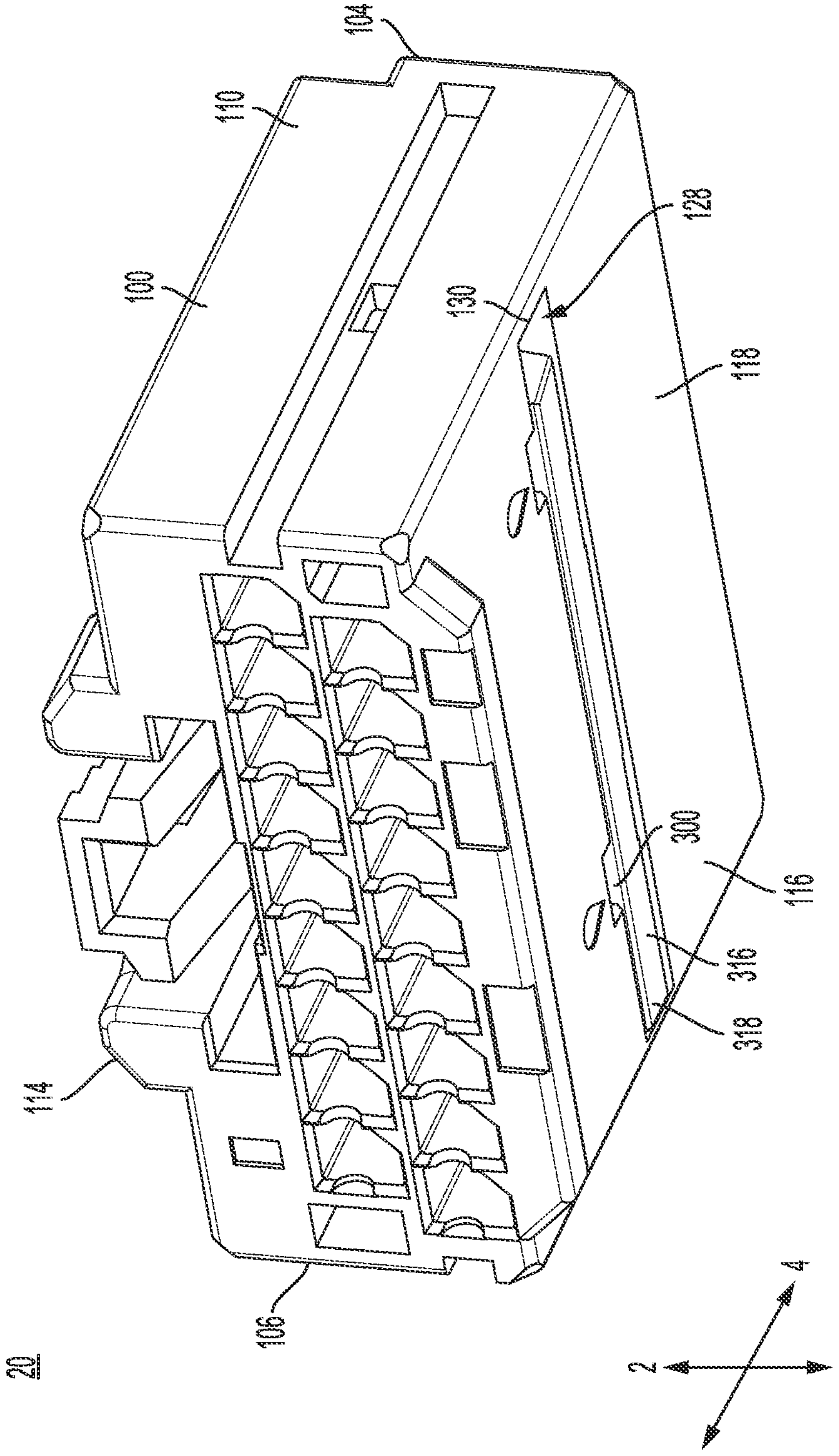
FIG. 2 is a perspective view of a female connector housing and terminal position assurance member according to various aspects.
Figure 3:
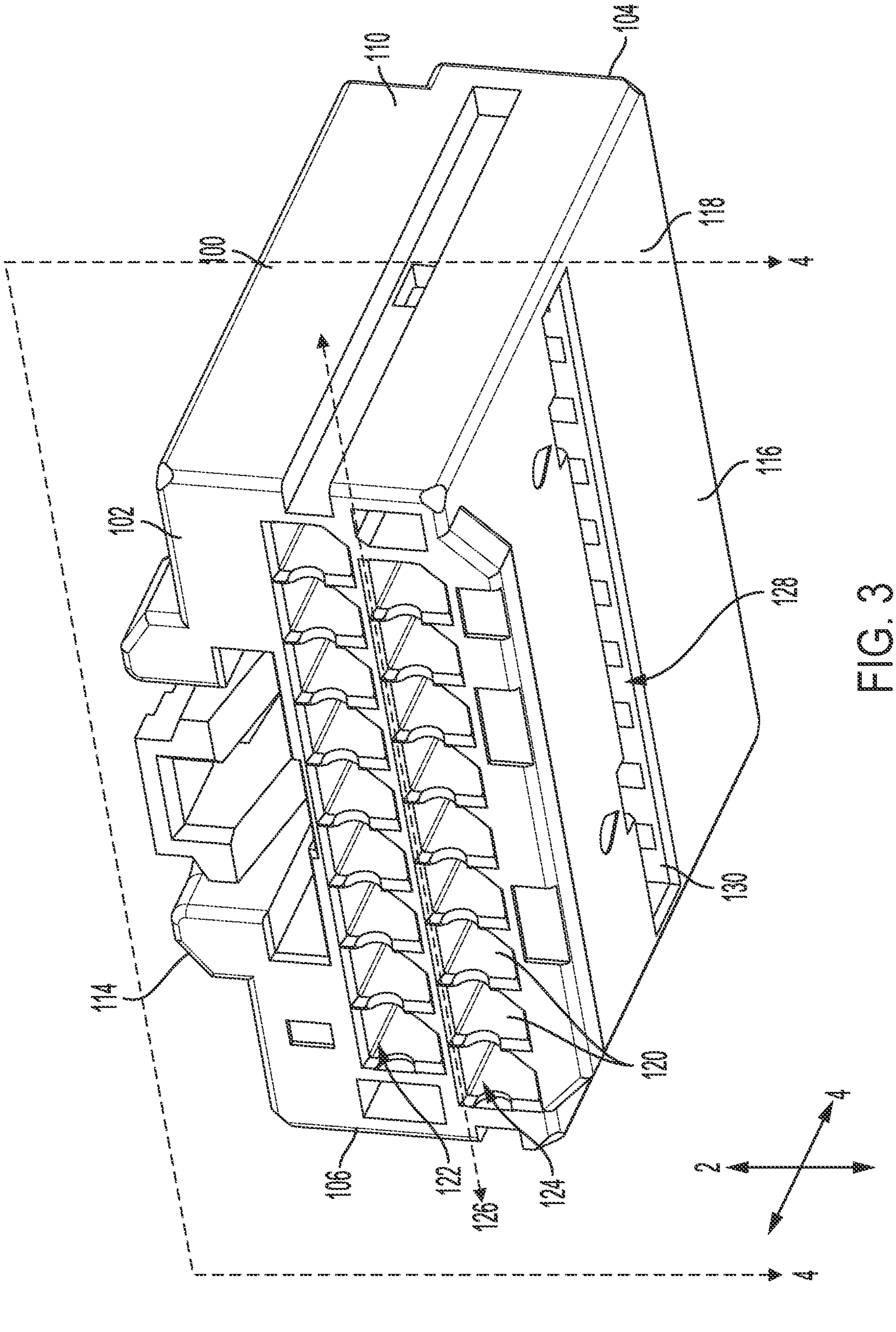
FIG. 3 is a perspective view of the female connector housing of FIG. 1.

As shown in FIGS. 1-3, female housing 100 can also include a front 102, a rear 104, a first side 106, and a second side 110. Female housing 100 can include a TPA member aperture 128 to receive TPA member 300. TPA member aperture 128 can extend upward along an axis generally parallel to a transverse axis 2 from a bottom end 116 of female housing 100 to a position between a top end 114 and bottom end 116 of female housing 100. In an aspect, TPA member aperture 128 can extend through a bottom surface 118 of bottom end 116. TPA member aperture 128 can be intermediate to first side 106 and second side 110, and intermediate to front 102 and rear 104.

In addition to TPA member aperture 128, female housing 100 can include one or more terminal apertures 120 to receive terminal segments. Terminal apertures 120 can extend from front 102 of female housing 100 along an axis generally parallel to a longitudinal axis 4 to a portion of female housing 100 between front 102 and rear 104 of female housing 100. In an aspect, terminal apertures 120 can intersect TPA member aperture 128 at a portion of female housing 100 intermediate to front 102 and rear 104 of female housing 100.

In some aspects, terminal apertures 120 can be disposed between first side 106 and second side 110 of female housing 100 along front 102. In some aspects, female housing 100 can include a plurality of terminal apertures 120. The plurality of terminal apertures 120 can be arranged in one or more rows, such as one row, two rows, three rows, four rows, or five rows. As shown in FIG. 3, female housing 100 can include a first row 122 of terminal apertures 120 and a second row 124 of terminal apertures 120 positioned below first row 122. In some aspects, first row 122 and second row 124 can be separated by a row axis 126. First row 122 can be above row axis 126 and second row 124 can be below row axis 126. In an aspect, TPA member aperture 128 can extend upward from bottom end 116 of female housing 100 along an axis generally parallel to transverse axis 2 to a position below row axis 126. In an aspect, TPA member aperture 128 can extend upward from bottom end 116 of female housing 100 to row axis 126. In an aspect, TPA member aperture 128 can extend upward from bottom end 116 of female housing 100 to a position above row axis 126.

TPA member 300 can be inserted into TPA member aperture 128. For example, a top end 310 (FIG. 7) of TPA member 300 can be inserted into TPA member aperture 128. As shown in FIG. 1, visual feedback can be provided to indicate that TPA member 300 is in pre-lock position 10. In other words, TPA member 300 being partially disposed and extending outwardly from female housing 100 can indicate that TPA member 300 is in pre-lock position 10. In pre-lock position 10, bottom end 316 of TPA member 300 can extend below bottom end 116 of female housing 100. As shown, bottom end 316 of TPA member 300 can extend outwardly from female housing 100 at a distance D5 from bottom end 116 of female housing 100. In some aspects, D5 can range from approximately 0.5 millimeters (mm) to approximately 4 mm, such as approximately 0.7 mm to approximately 2 mm, such as approximately 1.1 mm. With reference to FIG. 3, TPA member aperture 128 can include aperture sidewall 130. TPA member 300 can be disposed in TPA member aperture 128 such that TPA member 300 can fit within aperture sidewall 130 extending around TPA member 300. A clearance can exist between aperture sidewall 130 and TPA member 300 to allow TPA member 300 to move within TPA member aperture 128 between pre-lock position 10 and final lock position 20, shown in FIG. 2.

Figure 4:
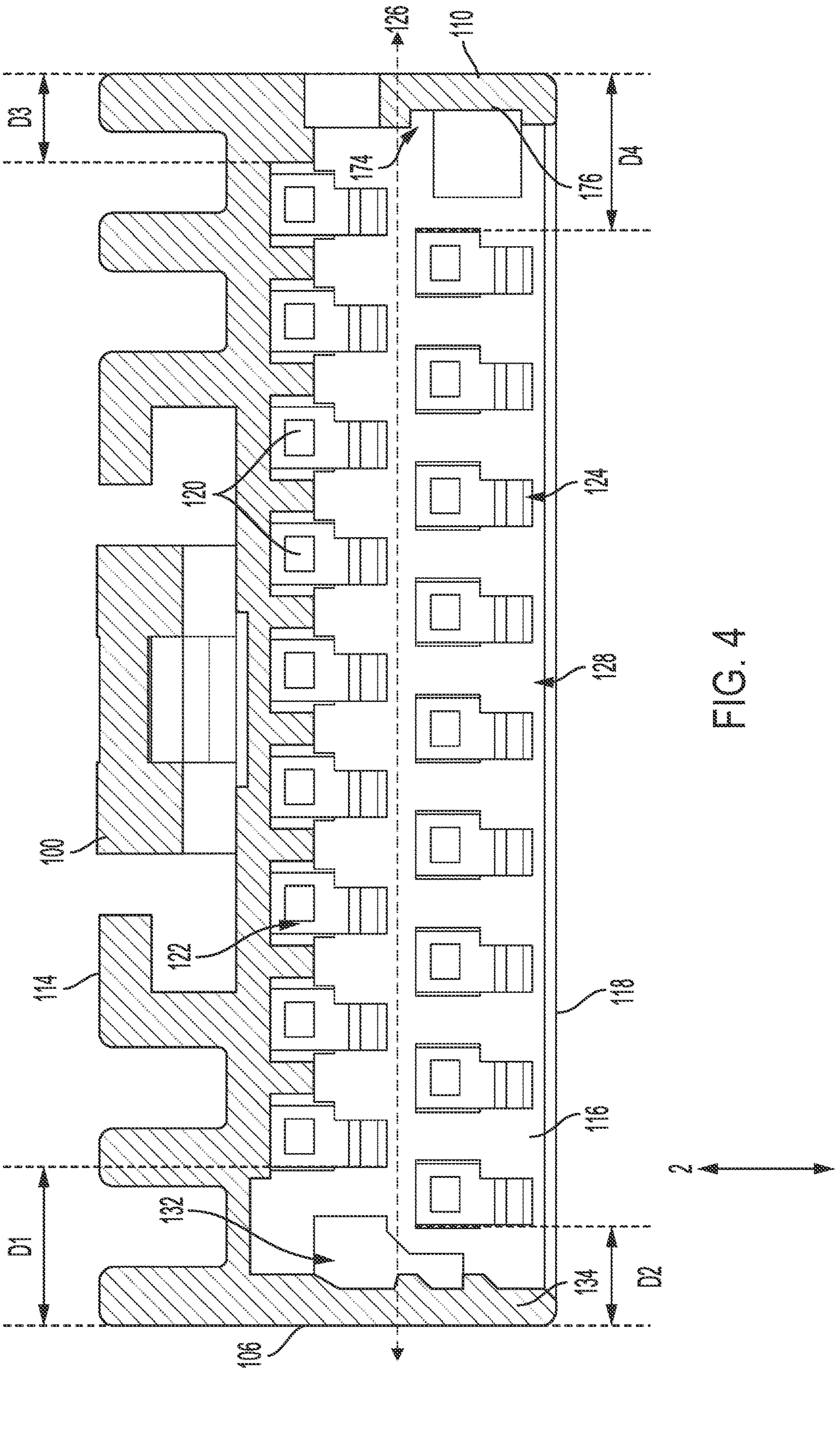
FIG. 4 is a side cross-sectional view of the female connector housing in FIG. 3 along line 4-4.

TPA member 300 can be inserted into TPA member aperture 128 such that it is installed in female housing 100. Together, female housing 100 and TPA member 300 in pre-lock position 10 can form a pre-installed assembly, shown in FIG. 1. TPA member 300 can be uninstalled by intentionally removing it from female housing 100. TPA member 300 can be retained in TPA member aperture 128 to prevent unintentional removal via one or more retention apertures. As shown in FIG. 4, in some aspects, female housing 100 can include a first retention aperture 132 and a second retention aperture 174. In some aspects, TPA member aperture 128 can include first retention aperture 132 and second retention aperture 174 to receive and retain TPA member 300. Accordingly, first retention aperture 132 and second retention aperture 174 can extend upward from bottom end 116 of female housing 100 along an axis generally parallel to transverse axis 2 to a position between top end 114 and bottom end 116 of female housing 100. In addition, first retention aperture 132 and second retention aperture 174 can be intermediate to first side 106 and second side 110, and intermediate to front 102 and rear 104, respectively.

In some aspects, first retention aperture 132 and second retention aperture 174 can be positioned centrally in TPA member aperture 128. In some aspects, first retention aperture 132 and second retention aperture 174 can be positioned adjacent to sides of TPA member aperture 128. As shown, in an aspect, first retention aperture 132 can be adjacent first side 106 of female housing 100. In an aspect, first retention aperture 132 can be adjacent second side 110 of female housing 100. In some aspects, first retention aperture 132 can be between first side 106 and terminal apertures 120. In an aspect, first retention aperture 132 can be between first side 106 and first row 122 of terminal apertures 120 above row axis 126. In an aspect, first retention aperture 132 can be between first side 106 and second row 124 of terminal apertures 120 below row axis 126. Similarly, in some aspects, second retention aperture 174 can be between second side 110 and terminal apertures 120. In an aspect, second retention aperture 174 can be between second side 110 and first row 122 of terminal apertures 120 above row axis 126. In an aspect, second retention aperture 174 can be between second side 110 and second row 124 of terminal apertures 120 below row axis 126.

As first retention aperture 132 can be between first side 106 and first row 122 of terminal apertures 120 above row axis 126 and between first side 106 and second row 124 of terminal apertures 120 below row axis 126, first row 122 and second row 124 of terminal apertures 120 can be at a distance from first side 106. Similarly, as second retention aperture 174 can be between second side 110 and first row 122 of terminal apertures 120 above row axis 126 and between second side 110 and second row 124 of terminal apertures 120 below row axis 126, first row 122 and second row 124 of terminal apertures 120 can be at a distance from second side 110.

In some aspects, first row 122 and second row 124 of terminal apertures 120 can be positioned the same distance from first side 106. In some aspects, first row 122 and second row 124 of terminal apertures 120 can be positioned at different distances from first side 106. In this way, first row 122 and second row 124 can be offset. Accordingly, first row 122 and second row 124 can be offset such that first row can be positioned at a distance D1 from first side 106. Distance D1 can be greater than a distance D2 from first side 106, where second row 124 can begin at distance D2. As shown, first row 122 at distance D1 from first side 106 can be positioned interior to second row 124 at distance D2 with respect to first side 106.

In some aspects, first row 122 and second row 124 of terminal apertures 120 can be positioned at the same distance from second side 110. In some aspects, first row 122 and second row 124 of terminal apertures 120 can be positioned at different distances from second side 110. In this way, first row 122 and second row 124 can be offset with respect to second side 110. Accordingly, first row 122 and second row 124 can be offset such that first row is positioned at a distance D3 from second side 110. Distance D3 can be less than a distance D4 from second side 110, where second row 124 can begin at distance D4. As shown, second row 124 at distance D4 from second side 110 can begin interior to first row 122 at distance D3 with respect to second side 110.

Figure 7:
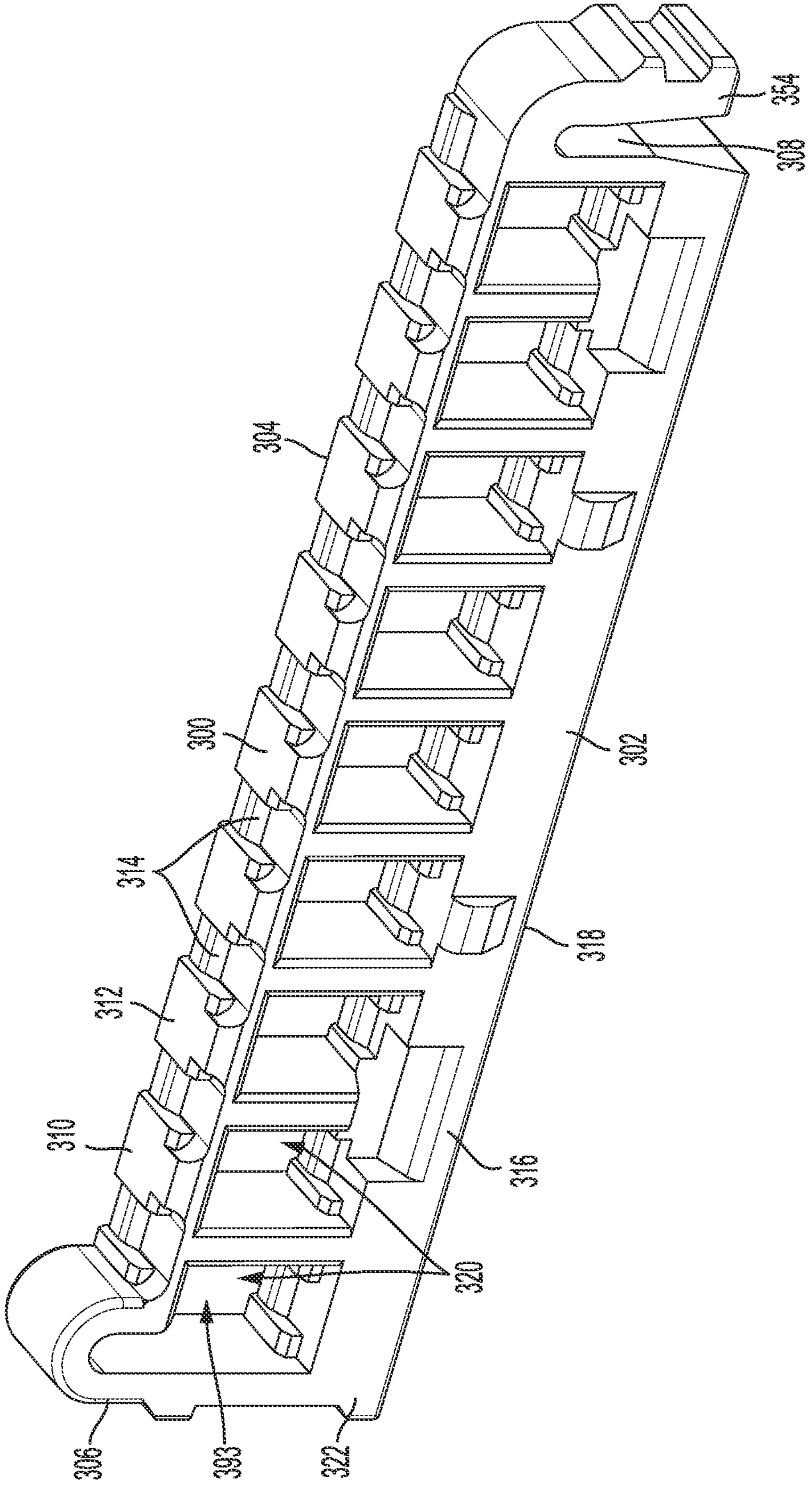
FIG. 7 is a perspective view of the terminal position assurance member of FIG. 1.

In some aspects, the offset first row 122 and second row 124 can create space in female housing 100 to form first retention aperture 132 and second retention aperture 174. In this way, first retention aperture 132 and second retention aperture 174 can fit portions of TPA member 300 (FIG. 7).

Figure 5:
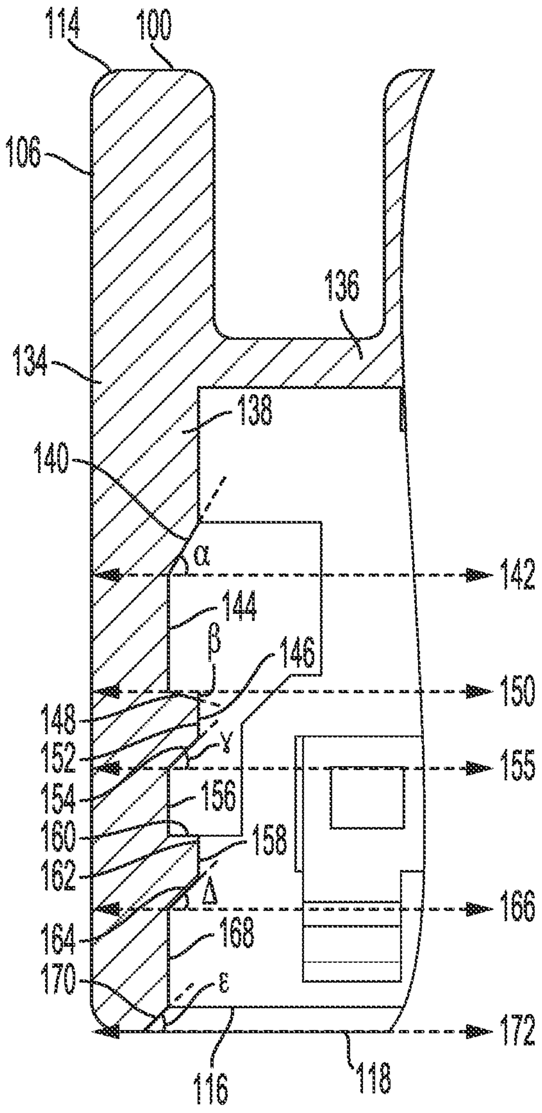
FIG. 5 is an enlarged partial view of the female connector housing in FIG. 4.
Figure 6:
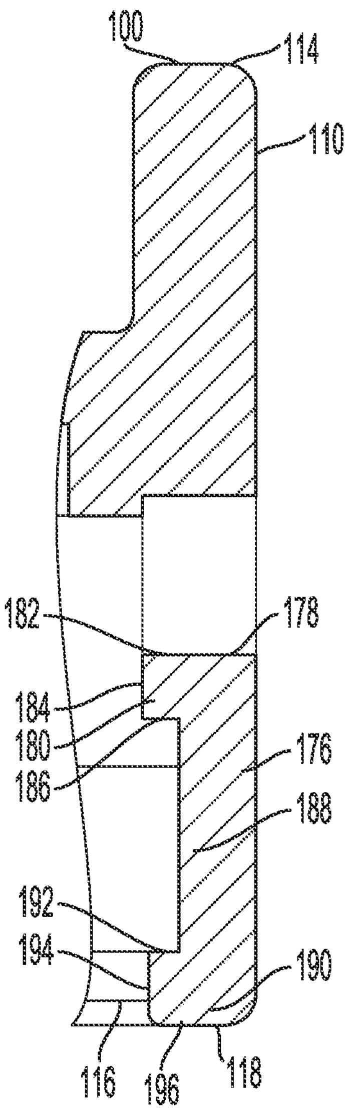
FIG. 6 is an enlarged partial view of the female connector housing in FIG. 4.

Referring now to FIGS. 4-6, in some aspects, retention apertures adjacent to first side 106 or second side 110 of female housing 100 can be bounded by one or more retention walls. As shown, in some aspects, first retention aperture 132 can be adjacent to first side 106 and bounded by a first retention wall 134. In some aspects, first retention wall 134 can extend from first side 106. In an aspect, first retention wall 134 can extend along a portion of first side 106. In an aspect, first retention wall 134 can be adjacent first retention aperture 132. In some aspects, second retention aperture 174 can be adjacent to second side 110 and bounded by a second retention wall 176. In some aspects, second retention wall 176 can extend from second side 110. In an aspect, second retention wall 176 can extend along a portion of second side 110. In an aspect, second retention wall 176 can be adjacent second retention aperture 174.

In some aspects, first retention wall 134 can include one or more protrusions, such as a first retention detent 146 and a first locking detent 158. The protrusions can extend outwardly from first retention wall 134 into first retention aperture 132 to retain TPA member 300 (FIG. 7) disposed in first retention aperture 132. In some aspects, second retention wall 176 can include one or more protrusions to retain TPA member 300, such as a second retention detent 180 and a second locking detent 190. The protrusions can extend outwardly from second retention wall 176 into second retention aperture 174 to retain TPA member 300 disposed in second retention aperture 174. In an aspect, first retention wall 134 and second retention wall 176 can facilitate retention of TPA member 300 in TPA member aperture 128.

With reference to FIG. 5, first retention wall 134 can include one or more protrusions (e.g., first retention detent 146 and first locking detent 158), such as approximately one protrusion to approximately five protrusions, such as approximately two protrusions to approximately four protrusions, such as approximately three protrusions. In some aspects, a protrusion can include a flat surface. In some aspects, a protrusion can include a slope or a curve. In some aspects, a protrusion can include a shaped surface (e.g., a chamfered, beveled, or curved surface). In some aspects, a protrusion can include a detent to fix TPA member 300 (FIG. 7) in a position. In some aspects, intermediate steps can separate protrusions. In some aspects, an intermediate step can include a flat surface. In some aspects, an intermediate step can include a slope or curve. In some aspects, an intermediate step can include a shaped surface (e.g., a chamfered, beveled, or curved surface). In some aspects, an intermediate step can include a protrusion that extends outwardly from first retention wall 134 to a lesser extent than a protrusion to fix TPA member 300 in a position (e.g., a detent).

In some aspects, first retention wall 134 can include approximately two protrusions to fix TPA member 300 (FIG. 7) in a position. In some aspects, first retention wall 134 can include first retention detent 146 and first locking detent 158 positioned below first retention detent 146. First retention detent 146 and first locking detent 158 can extend outwardly from first retention wall 134 to retain TPA member 300 (FIG. 7) in TPA member aperture 128 (FIG. 3). As shown, in some aspects, first retention detent 146 and first locking detent 158 can include one or more flat surfaces. In some aspects, first retention detent 146 and first locking detent 158 can include one or more slopes or curves. In some aspects, first retention detent 146 and first locking detent 158 can include one or more shaped surfaces (e.g., chamfered, beveled, or curved surfaces).

In some aspects and as shown in FIG. 5, first retention detent 146 can include a top surface 148, an intermediate surface 152, and a bottom surface 154. Intermediate surface 152 can be between top surface 148 and bottom surface 154. In an aspect, top surface 148 can include a flat surface. In an aspect, top surface 148 can include a slope or a curve. In some aspects, top surface 148 can include a shaped surface. In an aspect, top surface 148 can be beveled. In some aspects, top surface 148 can be at a bevel angle, B, from an axis 150 of first retention detent 146. In some aspects, bevel angle, B, can be an acute angle. In some aspects, bevel angle, B, can range from approximately 5 degrees to approximately 60 degrees, such as approximately 15 degrees to approximately 45 degrees, such as approximately 30 degrees. In an aspect, intermediate surface 152 can include a flat surface. In an aspect, intermediate surface 152 can include a slope or a curve. In some aspects, intermediate surface 152 can include a shaped surface. In an aspect, bottom surface 154 can include a flat surface. In an aspect, bottom surface 154 can include a slope or a curve. In some aspects, bottom surface 154 can include a shaped surface. In an aspect, bottom surface 154 can be beveled. In some aspects, bottom surface 154 can be at a bevel angle, Y, from an axis 155 of first retention detent 146. In some aspects, bevel angle, y, can be an acute angle. In some aspects, bevel angle, y, can range from approximately 5 degrees to approximately 60 degrees, such as approximately 15 degrees to approximately 45 degrees, such as approximately 30 degrees.

In some aspects, first locking detent 158 can include a top surface 160, an intermediate surface 162, and a bottom surface 164. Intermediate surface 162 can be between top surface 160 and bottom surface 164. In an aspect, top surface 160 can include a flat surface. In an aspect, top surface 160 can include a slope or a curve. In some aspects, top surface 160 can include a shaped surface. In an aspect, intermediate surface 162 can include a flat surface. In an aspect, intermediate surface 162 can include a slope or a curve. In some aspects, intermediate surface 162 can include a shaped surface. In an aspect, bottom surface 164 can include a flat surface. In an aspect, bottom surface 164 can include a slope or a curve. In some aspects, bottom surface 164 can include a shaped surface. In an aspect, bottom surface 164 can be beveled. In some aspects, bottom surface 164 can be at a bevel angle, A, from an axis 166 of first locking detent 158. In some aspects, bevel angle, A, can be an acute angle. In some aspects, bevel angle, A, can range from approximately 5 degrees to approximately 60 degrees, such as approximately 15 degrees to approximately 45 degrees, such as approximately 30 degrees.

In some aspects, first retention wall 134 can include a first intermediate step 144 above first retention detent 146. In an aspect, first intermediate step 144 can include a flat surface. In an aspect, first intermediate step 144 can include a slope or curve. In an aspect, first intermediate step 144 can include a shaped surface.

In some aspects, first retention wall 134 can include a flat surface above first intermediate step 144. In an aspect, first retention wall 134 can include a slope or a curve above first intermediate step 144. In an aspect, first retention wall 134 can include a shaped surface above first intermediate step 144. In an aspect, first retention wall 134 can include an upper bevel 140 above first intermediate step 144. In some aspects, upper bevel 140 can be at a bevel angle, a, from an axis 142 of first retention detent 146. In some aspects, bevel angle, a, can be an acute angle. In some aspects, bevel angle, a, can range from approximately 5 degrees to approximately 60 degrees, such as approximately 15 degrees to approximately 45 degrees, such as approximately 30 degrees.

In some aspects, first retention wall 134 can include an upper step 138 above upper bevel 140. In an aspect, upper step 138 can include a flat surface. In an aspect, upper step 138 can include a slope or a curve. In an aspect, upper step 138 can include a shaped surface.

In some aspects, first retention wall 134 can include a first top surface 136. In some aspects, first top surface 136 can be perpendicular to an upper step 138. In an aspect, first top surface 136 can include a flat surface. In an aspect, first top surface 136 can include a slope or a curve. In an aspect, first top surface 136 can include a shaped surface.

In some aspects, first retention wall 134 can include a second intermediate step 156 below first retention detent 146. Second intermediate step 156 can be between first retention detent 146 and first locking detent 158. In an aspect, second intermediate step 156 can include a flat surface. In an aspect, second intermediate step 156 can include a slope or curve. In an aspect, second intermediate step 156 can include a shaped surface.

In some aspects, first retention wall 134 can include a lower step 168 below first locking detent 158. In an aspect, lower step 168 can include a flat surface. In an aspect, lower step 168 can include a slope or curve. In an aspect, second lower step 168 can include a shaped surface.

In some aspects, first retention wall 134 can include a flat surface below lower step 168. In some aspects, first retention wall 134 can include a slope or curve below lower step 168. In an aspect, first retention wall 134 can include a shaped surface below lower step 168. In an aspect, first retention wall 134 can include a lower chamfer 170 below lower step 168. In some aspects, lower chamfer 170 can be at a chamfer angle, ¿, from an axis 172 of first retention detent 146. In some aspects, bevel angle, ¿, can be an acute angle. In some aspects, bevel angle, ¿, can range from approximately 5 degrees to approximately 60 degrees, such as approximately 15 degrees to approximately 45 degrees, such as approximately 30 degrees.

With reference to FIG. 6, second retention wall 176 can include one or more protrusions (e.g., second retention detent 180 and second locking detent 190), such as approximately one protrusion to approximately five protrusions, such as approximately two protrusions to approximately four protrusions, such as approximately three protrusions. In some aspects, a protrusion can include a flat surface. In some aspects, a protrusion can include a slope or a curve. In some aspects, a protrusion can include a shaped surface (e.g., a chamfered, beveled, or curved surface). In some aspects, a protrusion can include a detent to fix TPA member 300 (FIG. 7) in a position. In some aspects, intermediate steps can separate protrusions. In some aspects, an intermediate step can include a flat surface. In some aspects, an intermediate step can include a slope or curve. In some aspects, an intermediate step can include a shaped surface (e.g., a chamfered, beveled, or curved surface). In some aspects, an intermediate step can include a protrusion that extends outwardly from second retention wall 176 to a lesser extent than a protrusion to fix TPA member 300 in a position (e.g., a detent).

In some aspects, second retention wall 176 can include approximately two protrusions to fix TPA member 300 (FIG. 6) in a position. In some aspects, second retention wall 176 can include second retention detent 180 and second locking detent 190 positioned below second retention detent 180. Second retention detent 180 and second locking detent 190 can extend outwardly from second retention wall 176 to retain TPA member 300 (FIG. 6) in TPA member aperture 128 (FIG. 3). As shown, in some aspects, second retention detent 180 and second locking detent 190 can include one or more flat surfaces. In some aspects, second retention detent 180 and second locking detent 190 can include one or more slopes or curves. In some aspects, second retention detent 180 and second locking detent 190 can include one or more shaped surfaces (e.g., chamfered, beveled, or curved surfaces).

In some aspects, second retention detent 180 can include a top surface 182, an intermediate surface 184, and a bottom surface 186. Intermediate surface 184 can be between top surface 182 and bottom surface 186. In an aspect, top surface 182 can include a flat surface. In an aspect, top surface 182 can include a slope or a curve. In some aspects, top surface 182 can include a shaped surface. In an aspect, intermediate surface 184 can include a flat surface. In an aspect, intermediate surface 184 can include a slope or a curve. In some aspects, intermediate surface 184 can include a shaped surface. In an aspect, bottom surface 186 can include a flat surface. In an aspect, bottom surface 186 can include a slope or a curve. In some aspects, bottom surface 186 can include a shaped surface.

In some aspects, second locking detent 190 can include a top surface 192, an intermediate surface 194, and a bottom surface 196. Intermediate surface 194 can be between top surface 192 and bottom surface 196. In an aspect, top surface 192 can include a flat surface. In an aspect, top surface 192 can include a slope or a curve. In some aspects, top surface 192 can include a shaped surface. In an aspect, intermediate surface 194 can include a flat surface. In an aspect, intermediate surface 194 can include a slope or a curve. In some aspects, intermediate surface 194 can include a shaped surface. In an aspect, bottom surface 196 can include a flat surface. In an aspect, bottom surface 196 can include a slope or a curve. In some aspects, bottom surface 196 can include a shaped surface.

In some aspects, second retention wall 176 can include an intermediate step 188 below second retention detent 180. Intermediate step 188 can be between second retention detent 180 and second locking detent 190. In an aspect, intermediate step 188 can include a flat surface. In an aspect, intermediate step 188 can include a slope or curve. In an aspect, second intermediate step 188 can include a shaped surface.

In some aspects, second retention wall 176 can include a second top surface 178. In some aspects, second top surface 178 can be perpendicular to intermediate step 188. In an aspect, second top surface 178 can include a flat surface. In an aspect, second top surface 178 can include a slope or a curve. In an aspect, second top surface 178 can include a shaped surface.

With reference to FIGS. 5-7, in some aspects, first retention aperture 132 and second retention aperture 174 of female housing 100 can fit one or more lock arms of TPA member 300, such as a first lock arm 322 and a second lock arm 354. In some aspects, lock arms can retain TPA member 300 in first retention aperture 132 and second retention aperture 174. TPA member 300 can be fixed in a position in TPA member aperture 128 (FIG. 3) because of the interference between first retention wall 134 and second retention wall 176 and lock arms of TPA member 300. In this way, first retention aperture 132 and second retention aperture 174 can fix TPA member 300 in a position.

Figure 8:
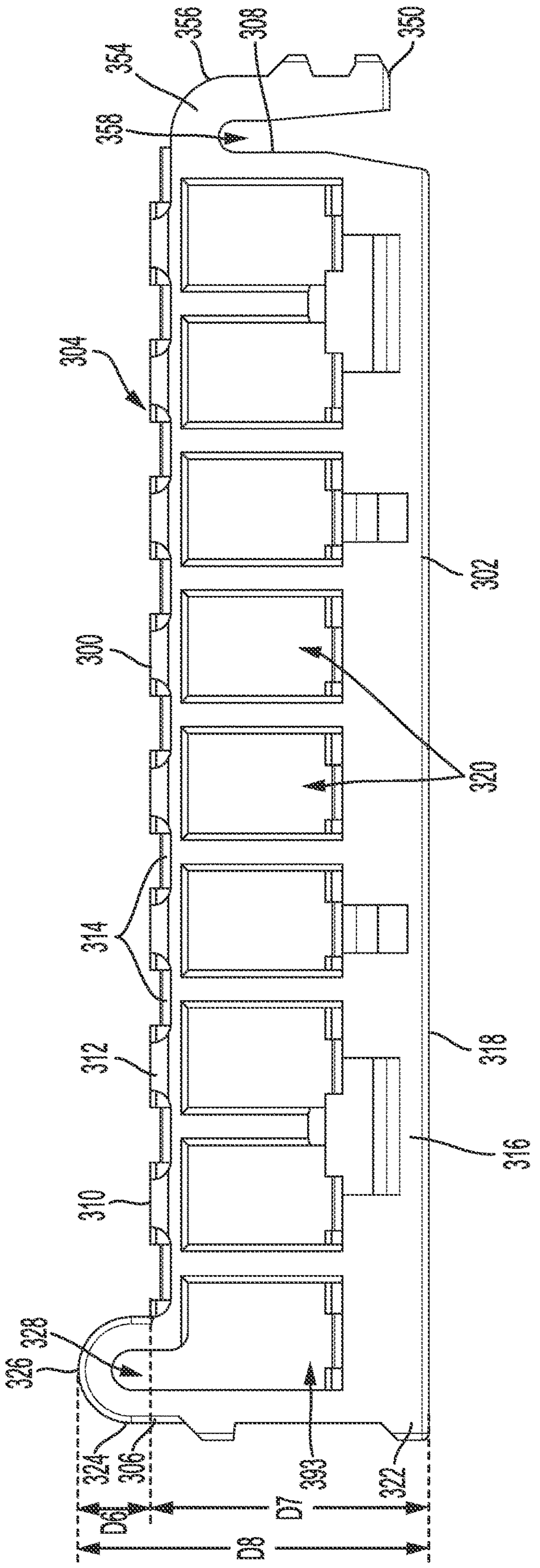
FIG. 8 is a front view of the terminal position assurance member of FIG. 1.

TPA member 300 is shown in FIGS. 7-8. TPA member 300 can include a front 302, a rear 304, a first side 306, a second side 308, a top end 310, and a bottom end 316. In some aspects, TPA member 300 can include terminal indents 314 along a top surface 312 of top end 310 to support first row 122 of female housing 100 terminal apertures 120 (FIG. 3). In some aspects, TPA member 300 can include one or more terminal apertures 320 arranged in a terminal aperture row 393 to support second row 124 of female housing 100 terminal apertures 120 (FIG. 3). As shown, in some aspects, TPA member 300 can include one terminal aperture row 393. In other aspects, TPA member 300 can include more than one terminal aperture row 393.

Referring now to FIG. 8, in some aspects, TPA member 300 can include one or more lock arms, such as approximately one lock arm to approximately five lock arms, such as approximately two lock arms to fix TPA member 300 in a position in TPA member aperture 128 (FIG. 3). Lock arms of TPA member 300 can be fixed or cantilevered. In some aspects, TPA member 300 can include one or more fixed lock arms that are fixed at both ends. Fixed lock arms can be elongated such that they can flex (e.g., elastically deform) when stressed during insertion of TPA member 300 into and removal of TPA member 300 from TPA member aperture 128. In some aspects, TPA member 300 can include one or more cantilevered lock arms. Cantilevered lock arms can be fixed at one end.

In some aspects, TPA member 300 can include one or more fixed lock arms and one or more cantilevered lock arms. In some aspects, fixed lock arms and cantilevered lock arms can be different shapes such that TPA member 300 is asymmetrical.

In some aspects, TPA member 300 can include first lock arm 322 and second lock arm 354. First lock arm 322 can retain TPA member 300 in first retention aperture 132 (FIG. 5). Second lock arm 354 can retain TPA member 300 in second retention aperture 174 (FIG. 6). In some aspects, first lock arm 322 can be fixed and second lock arm 354 can be cantilevered such that TPA member 300 is asymmetrical.

In some aspects, first side 306 of TPA member 300 can include first lock arm 322. In some aspects, second side 308 can include second lock arm 354. In some aspects, D7 can be a distance from bottom surface 318 to top end 310 of TPA member 300. In some aspects, D8 can be a distance from a bottom surface 318 of TPA member 300 to a top surface 326. In some aspects, D8 can be greater than D7. In some aspects, a ratio of the distance from bottom surface 318 to top end 310 to the distance from bottom surface 318 to top surface 326, e.g., D7 to D8, can be between approximately ⅔ and approximately ⅞.

In some aspects, first lock arm 322 and second lock arm 354 can be positioned centrally in TPA member 300 such that they are positioned toward a middle of TPA member 300. In some aspects, first lock arm 322 and second lock arm 354 can be positioned proximally in TPA member 300 such that they are adjacent to sides of TPA member 300. In an aspect, first lock arm 322 can be adjacent first side 306 of TPA member 300. In an aspect, first lock arm 322 can be adjacent second side 308 of TPA member 300. In an aspect, second lock arm 354 can be adjacent first side 306. In an aspect, second lock arm 354 can be adjacent second side 308. As shown, in some aspects, first lock arm 322 can extend outwardly from top end 310 of TPA member 300. In some aspects, first lock arm 322 can extend outwardly from top end 310 of TPA member 300 adjacent first side 306. In some aspects, second lock arm 354 can extend outwardly from first side 306.

In some aspects, first side 306 can include first lock arm 322 and second side 308 can include second lock arm 354 such that TPA member 300 is asymmetrical. In other words, first side 306 and second side 308 can have different shapes because of including first lock arm 322 and second lock arm 354, respectively. Accordingly, TPA member 300 can be asymmetrical by including different shapes at first side 306 and second side 308.

In some aspects, first lock arm 322 is not cantilevered. In an aspect, first lock arm 322 can be fixed at both ends. In some aspects, first lock arm can be elongated. As shown in FIG. 8, first lock arm 322 can extend outwardly from top end 310 of TPA member 300. In some aspects, an aperture 328 can extend through first lock arm 322. First lock arm 322 can include a locking surface 324 extending around aperture 328 to engage first retention wall 134 of first retention aperture 132 (FIG. 5). In some aspects, locking surface 324 can include first side 306 of TPA member 300.

In some aspects, locking surface 324 can include top surface 326 of first lock arm 322. Top surface 326 can extend outwardly from top end 310 of TPA member 300 adjacent first side 306. In an aspect, top surface 326 can include a flat surface. In an aspect, top surface 326 can include a slope or a curve. In an aspect, top surface 326 can extend above top end 310 at a distance D6. In some aspects, D8 can be greater than D6. In some aspects, D7 can be greater than D6.

In some aspects, locking surface 356 can include an upper step 330 of first lock arm 322. Upper step 330 can be below top surface 326. In an aspect, upper step 330 can include a flat surface. In an aspect, upper step 330 can include a slope or a curve. In an aspect, upper step 330 can include a shaped surface.

With reference to FIG. 8, first lock arm 322 can include one or more protrusions (e.g., a first retention detent 332 and a first locking detent 344), such as approximately one protrusion to approximately five protrusions, such as approximately two protrusions to approximately four protrusions, such as approximately three protrusions. In some aspects, a protrusion can include a flat surface. In some aspects, a protrusion can include a slope or a curve. In some aspects, a protrusion can include a shaped surface (e.g., a chamfered, beveled, or curved surface). In some aspects, a protrusion can include a detent to fix TPA member 300 in a position. In some aspects, intermediate steps can separate protrusions. In some aspects, an intermediate step can include a flat surface. In some aspects, an intermediate step can include a slope or curve. In some aspects, an intermediate step can include a shaped surface (e.g., a chamfered, beveled, or curved surface). In some aspects, an intermediate step can include a protrusion that extends outwardly from first lock arm 322 to a lesser extent than a protrusion to fix TPA member 300 in a position (e.g., a detent).

Figure 9:
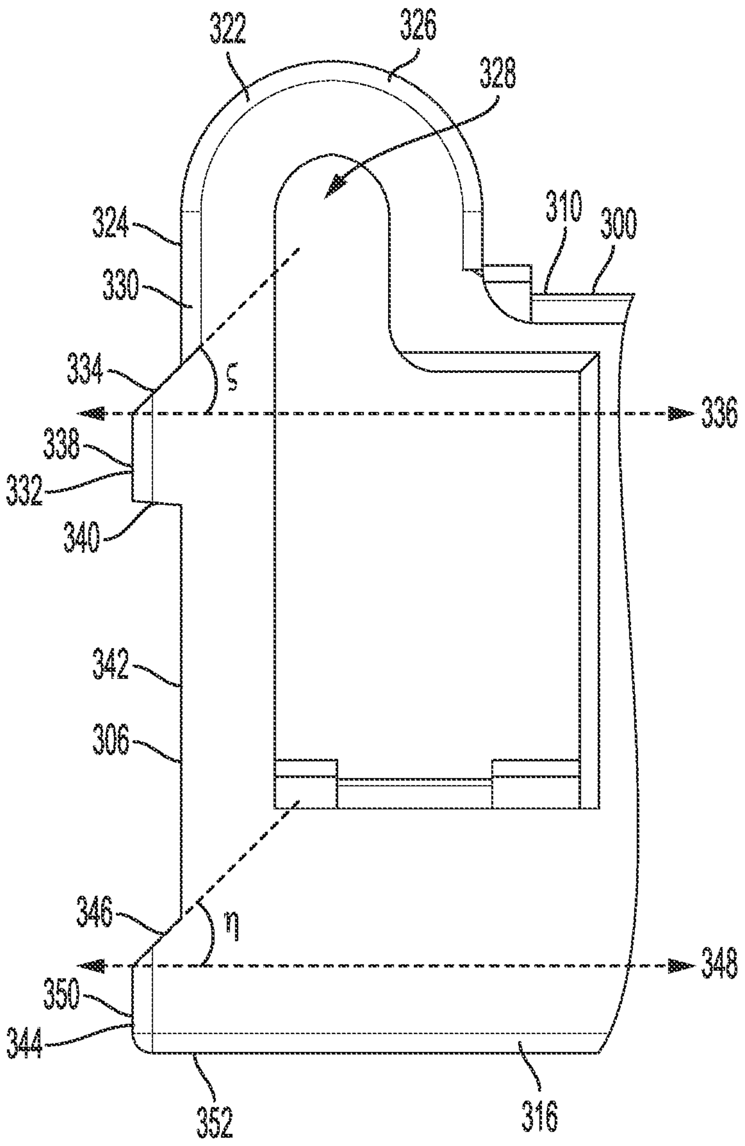
FIG. 9 is an enlarged partial view of the terminal position assurance member in FIG. 1.

As shown in FIG. 9, in some aspects, locking surface 324 can include first retention detent 332 and first locking detent 344 of first lock arm 322. First retention detent 332 can be positioned below upper step 330. First locking detent 344 can be positioned below first retention detent 332. First retention detent 332 and first locking detent 344 can extend outwardly from first lock arm 322 to retain TPA member 300 in first retention aperture 132 (FIG. 5). In some aspects, first retention detent 332 and first locking detent 344 can extend outwardly from first side 306 of TPA member 300. As shown, in some aspects, first retention detent 332 and first locking detent 344 can include one or more flat surfaces. In some aspects, first retention detent 332 and first locking detent 344 can include one or more slopes or curves. In some aspects, first retention detent 332 and first locking detent 344 can include one or more shaped surfaces (e.g., chamfered, beveled, or curved surfaces).

In some aspects, first retention detent 332 can include a top surface 334, an intermediate surface 338, and a bottom surface 340. Intermediate surface 338 can be between top surface 334 and bottom surface 340. In an aspect, top surface 334 can include a flat surface. In an aspect, top surface 334 can include a slope or a curve. In some aspects, top surface 334 can include a shaped surface. In an aspect, top surface 334 can be beveled. In some aspects, top surface 334 can be at a bevel angle, ζ, from an axis 336 of first retention detent 332. In some aspects, bevel angle, ζ, can be an acute angle. In some aspects, bevel angle, ζ, can range from approximately 5 degrees to approximately 60 degrees, such as approximately 15 degrees to approximately 45 degrees, such as approximately 30 degrees. In an aspect, intermediate surface 338 can include a flat surface. In an aspect, intermediate surface 338 can include a slope or a curve. In some aspects, intermediate surface 338 can include a shaped surface. In an aspect, bottom surface 340 can include a flat surface. In an aspect, bottom surface 340 can include a slope or a curve. In some aspects, bottom surface 340 can include a shaped surface.

In some aspects, first locking detent 344 can include a top surface 346, an intermediate surface 350, and a bottom surface 352. Intermediate surface 350 can be between top surface 346 and bottom surface 352. In an aspect, top surface 346 can include a flat surface. In an aspect, top surface 346 can include a slope or a curve. In some aspects, top surface 346 can include a shaped surface. In an aspect, top surface 346 can be beveled. In some aspects, top surface 346 can be at a bevel angle, n, from an axis 348 of first locking detent 344. In some aspects, bevel angle, n, can be an acute angle. In some aspects, bevel angle, n, can range from approximately 5 degrees to approximately 60 degrees, such as approximately 15 degrees to approximately 45 degrees, such as approximately 30 degrees. In an aspect, intermediate surface 350 can include a flat surface. In an aspect, intermediate surface 350 can include a slope or a curve. In some aspects, intermediate surface 350 can include a shaped surface. In an aspect, bottom surface 352 can include a flat surface. In an aspect, bottom surface 352 can include a slope or a curve. In some aspects, bottom surface 352 can include a shaped surface.

In some aspects, first lock arm 322 can include an intermediate step 342 below first retention detent 332. Intermediate step 342 can be between first retention detent 332 and first locking detent 344. In an aspect, intermediate step 342 can include a flat surface. In an aspect, intermediate step 342 can include a slope or curve. In an aspect, intermediate step 342 can include a shaped surface.

Figure 10:
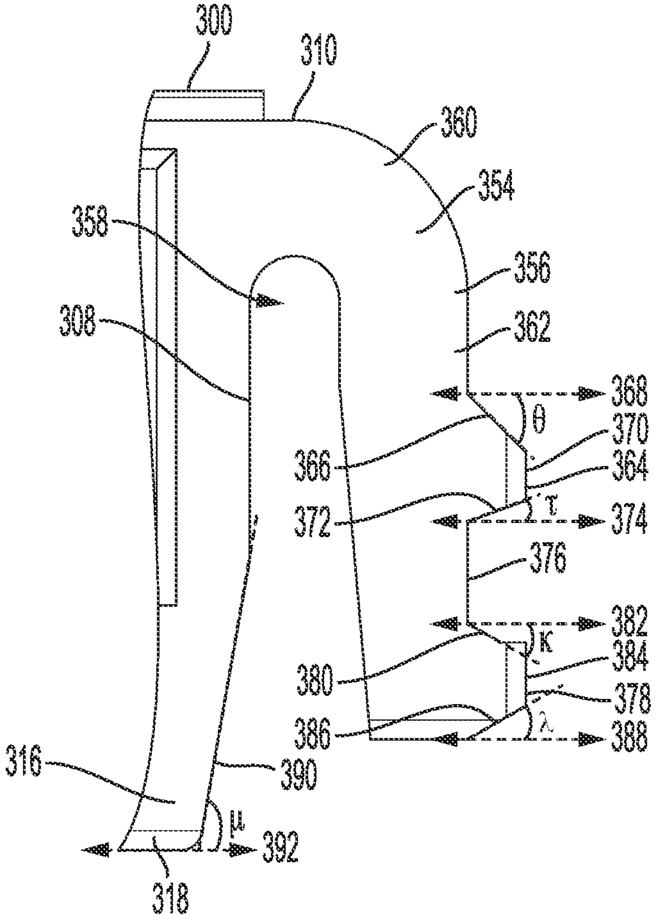
FIG. 10 is an enlarged partial view of the terminal position assurance member in FIG. 1.

Based on the foregoing, first lock arm 322 can be fixed at both ends and can extend outwardly from top end 310 of TPA member 300 while, as shown in FIG. 10, second lock arm 354 can be cantilevered such that it is fixed at one end and can extend outwardly from second side 308 of TPA member 300. Accordingly, TPA member 300 having fixed first lock arm 322 and cantilevered second lock arm 354 can be asymmetrical.

Referring to FIG. 10, in some aspects, second lock arm 354 can be cantilevered. In an aspect, second lock arm 354 can be fixed at one end. In some aspects, second lock arm 354 can extend outwardly from second side 308 of TPA member 300. In some aspects, an aperture 358 can extend between second side 308 of TPA member 300 and second lock arm 354. Second lock arm 354 can include a locking surface 356 extending over second lock arm 354 to engage second retention wall 176 of second retention aperture 174 (FIG. 6). In some aspects, second lock arm 354 can have a biased position, and can deflect inward away from the biased position. In some aspects, second lock arm 354 can deflect inward into aperture 358.

In some aspects, locking surface 356 can include a top surface 360 of second lock arm 354. In an aspect, top surface 360 can include a flat surface. In an aspect, top surface 360 can include a slope or a curve. In an aspect, top surface 360 can include a shaped surface.

In some aspects, locking surface 356 can include an upper step 362 of second lock arm 354. Upper step 362 can be below top surface 360. In an aspect, upper step 362 can include a flat surface. In an aspect, upper step 362 can include a slope or a curve. In an aspect, upper step 362 can include a shaped surface.

With reference to FIG. 9, second lock arm 354 can include one or more protrusions (e.g., a second retention detent 364 and a second locking detent 378), such as approximately one protrusion to approximately five protrusions, such as approximately two protrusions to approximately four protrusions, such as approximately three protrusions. In some aspects, a protrusion can include a flat edge. In some aspects, a protrusion can include a slope or a curve. In some aspects, a protrusion can include a shaped surface (e.g., a chamfered, beveled, or curved surface). In some aspects, a protrusion can include a detent to fix TPA member 300 in a position. In some aspects, intermediate steps can separate protrusions. In some aspects, an intermediate step can include a flat edge. In some aspects, an intermediate step can include a slope or curve. In some aspects, an intermediate step can include a shaped surface (e.g., a chamfered, beveled, or curved surface). In some aspects, an intermediate step can include a protrusion that extends outwardly from second lock arm 354 to a lesser extent than a protrusion to fix TPA member 300 in a position (e.g., a detent).

As shown in FIG. 10, in some aspects, locking surface 356 can include second retention detent 364 and second locking detent 378 of second lock arm 354. Second retention detent 364 can be positioned below upper step 362. Second locking detent 378 can be positioned below second retention detent 364. Second retention detent 364 and second locking detent 378 can extend outwardly from second lock arm 354 to retain TPA member 300 in second retention aperture 174 (FIG. 6). As shown, in some aspects, second retention detent 364 and second locking detent 378 can include one or more flat surfaces. In some aspects, second retention detent 364 and second locking detent 378 can include one or more slopes or curves. In some aspects, second retention detent 364 and second locking detent 378 can include one or more shaped surfaces (e.g., chamfered, beveled, or curved surfaces).

In some aspects, second retention detent 364 can include a top surface 366, an intermediate surface 370, and a bottom surface 372. Intermediate surface 370 can be between top surface 366 and bottom surface 372. In an aspect, top surface 366 can include a flat surface. In an aspect, top surface 366 can include a slope or a curve. In some aspects, top surface 366 can include a shaped surface. In an aspect, top surface 366 can be beveled. In some aspects, top surface 366 can be at a bevel angle, θ, from an axis 368 of second retention detent 364. In some aspects, bevel angle, θ, can be an acute angle. In some aspects, bevel angle, θ, can range from approximately 5 degrees to approximately 60 degrees, such as approximately 15 degrees to approximately 45 degrees, such as approximately 30 degrees. In an aspect, intermediate surface 370 can include a flat surface. In an aspect, intermediate surface 370 can include a slope or a curve. In some aspects, intermediate surface 370 can include a shaped surface. In an aspect, bottom surface 372 can include a flat surface. In an aspect, bottom surface 372 can include a slope or a curve. In some aspects, bottom surface 372 can include a shaped surface. In an aspect, bottom surface 372 can be beveled. In some aspects, bottom surface 372 can be at a bevel angle, ι, from an axis 374 of second retention detent 364. In some aspects, bevel angle, ι, can be an acute angle. In some aspects, bevel angle, ι, can range from approximately 5 degrees to approximately 60 degrees, such as approximately 15 degrees to approximately 45 degrees, such as approximately 30 degrees.

In some aspects, second locking detent 378 can include a top surface 380, an intermediate surface 384, and a bottom surface 386. Intermediate surface 384 can be between top surface 380 and bottom surface 386. In an aspect, top surface 380 can include a flat surface. In an aspect, top surface 380 can include a slope or a curve. In some aspects, top surface 380 can include a shaped surface. In some aspects, top surface 380 can be chamfered. In some aspects, top surface 380 can be at a chamfer angle, κ, from an axis 382 of second locking detent 378. In some aspects, chamfer angle, κ, can be an acute angle. In some aspects, chamfer angle, κ, can range from approximately 5 degrees to approximately 60 degrees, such as approximately 15 degrees to approximately 45 degrees, such as approximately 30 degrees. In an aspect, intermediate surface 384 can include a flat surface. In an aspect, intermediate surface 384 can include a slope or a curve. In some aspects, intermediate surface 384 can include a shaped surface. In an aspect, bottom surface 386 can include a flat surface. In an aspect, bottom surface 386 can include a slope or a curve. In some aspects, bottom surface 386 can include a shaped surface. In some aspects, bottom surface 386 can be chamfered. In some aspects, bottom surface 386 can be at a chamfer angle, λ, from an axis 388 of second locking detent 378. In some aspects, chamfer angle, λ, can be an acute angle. In some aspects, chamfer angle, λ, can range from approximately 5 degrees to approximately 60 degrees, such as approximately 15 degrees to approximately 45 degrees, such as approximately 30 degrees.

In some aspects, second lock arm 354 can include an intermediate step 376 below second retention detent 364. Intermediate step 376 can be between second retention detent 364 and second locking detent 378. In an aspect, intermediate step 376 can include a flat surface. In an aspect, intermediate step 376 can include a slope or curve. In an aspect, intermediate step 376 can include a shaped surface.

In some aspects, second lock arm 354 can deflect inward away from the biased position and toward second side 308 of TPA member 300. Second side 308 can include a bottom surface 390. In an aspect, bottom surface 390 can include a flat surface. In an aspect, bottom surface 390 can include a slope or a curve. In some aspects, bottom surface 390 can include a shaped surface. In an aspect, bottom surface 390 can be chamfered. In some aspects, bottom surface 390 can be at a chamfer angle, u, from an axis 392 of second side 308. In some aspects, chamfer angle, u, can be an acute angle. In some aspects, chamfer angle, u, can range from approximately 5 degrees to approximately 60 degrees, such as approximately 15 degrees to approximately 45 degrees, such as approximately 30 degrees.

Based on the foregoing, with reference to FIGS. 1-10, interference between first retention aperture 132 and first lock arm 322, and second retention aperture 174 and second lock arm 354, can retain TPA member 300 in TPA member aperture 128. TPA member 300 can be retained in TPA member aperture 128 in a pre-lock position 10. In pre-lock position 10, first lock arm 322 can be disposed in first retention aperture 132. Locking surface 324 of first lock arm 322 can engage first retention wall 134 to retain TPA member 300 in first retention aperture 132. Similarly, second lock arm 354 can be disposed in second retention aperture 174. Locking surface 356 of second lock arm 354 can engage second retention wall 176 to retain TPA member 300 in second retention aperture 174.

Figure 11:
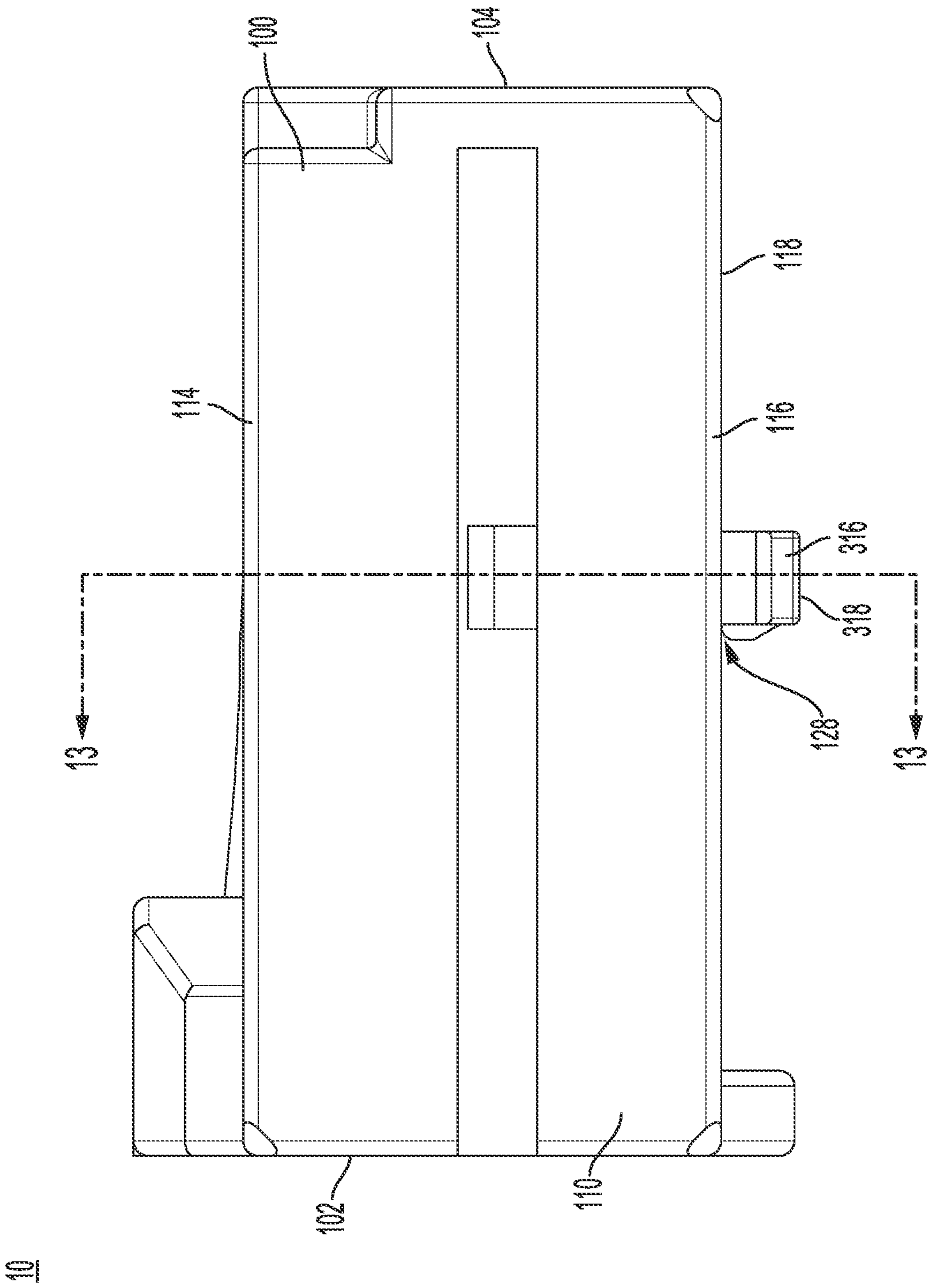
FIG. 11 is a side view of the female connector housing and terminal position assurance member in FIG. 1.
Figure 13:
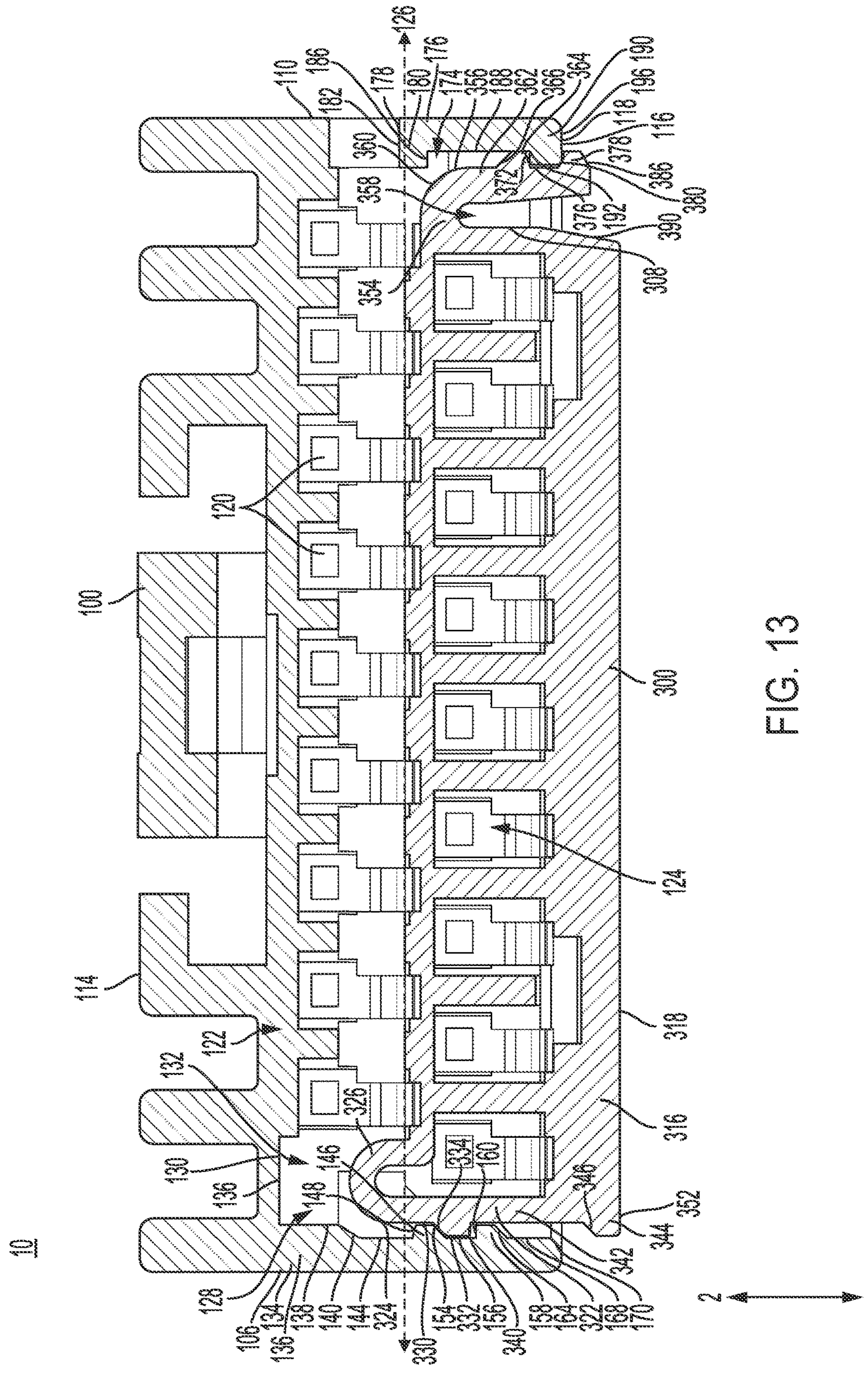
FIG. 13 is a side cross-sectional view of the female connector housing and terminal position assurance member in FIG. 11 along line 13-13.

With reference to FIGS. 11 and 13, first top surface 136 of first retention wall 134 can be positioned above second top surface 178 of second retention wall 176. First top surface 136 and second top surface 178 can be positioned above row axis 126. In some aspects, first intermediate step 144 of first retention wall 134 can be positioned above row axis 126. In some aspects, intermediate step 188 of second retention wall 176 can be positioned below row axis 126.

Pre-lock position 10 is shown in FIGS. 11 and 13. In pre-lock position 10, TPA member 300 can be partially disposed in TPA member aperture 128. Accordingly, bottom end 316 of TPA member 300 can extend below bottom surface 118 of female housing 100.

Accordingly, visual feedback of TPA member 300 being partially disposed in female housing 100 can signal that TPA member 300 is in pre-lock position 10. TPA member 300 can be disposed in TPA member aperture 128 such that TPA member 300 can fit between aperture sidewall 130. A clearance can exist between aperture sidewall 130 and TPA member 300 to allow TPA member 300 to move within TPA member aperture 128. In some aspects, aperture sidewall 130 can include first retention wall 134 and second retention wall 176.

As shown in FIG. 13, first retention detent 146 and first locking detent 158 can extend outwardly from first retention wall 134 of first retention aperture 132 to retain first lock arm 322 of TPA member 300 in first retention aperture 132. First retention detent 332 and first locking detent 344 can extend outwardly from first lock arm 322 to engage first retention detent 146 and first locking detent 158 of first retention wall 134 and retain TPA member 300 in first retention aperture 132.

In pre-lock position 10, first retention detent 146 of first retention wall 134 can be positioned below row axis 126. In some aspects, first retention detent 332 of first lock arm 322 can be positioned below row axis 126. In some aspects, first retention detent 332 of first lock arm 322 can be disposed between first retention detent 146 and first locking detent 158 to retain TPA member 300 in first retention aperture 132. In some aspects, first lock arm 322 can be disposed in first retention aperture 132 such that first lock arm 322 can extend above row axis 126. In some aspects, first locking detent 344 can be positioned below lower chamfer 170 of first retention wall 134.

Second retention detent 180 and second locking detent 190 can extend outwardly from second retention wall 176 of second retention aperture 174 to retain second lock arm 354 of TPA member 300 in second retention aperture 174. Second retention detent 364 and second locking detent 378 can extend outwardly from second lock arm 354 to engage second retention detent 180 and second locking detent 190 of second retention wall 176 and retain TPA member 300 in second retention aperture 174.

In some aspects, second retention detent 364 of second lock arm 354 can be disposed between second retention detent 180 and second locking detent 190 to retain second lock arm 354 of TPA member 300 in second retention aperture 174. In some aspects, second locking detent 190 can be disposed between second retention detent 364 and second locking detent 378. In some aspects, second lock arm 354 can be biased such that second locking detent 190 is disposed between second retention detent 364 and second locking detent 378. In some aspects, bottom surface 390 can extend below second locking detent 190 of second retention wall 176. In some aspects, second lock arm 354 can be disposed in second retention aperture 174 such that second lock arm 354 can extend to row axis 126.

Figure 14:
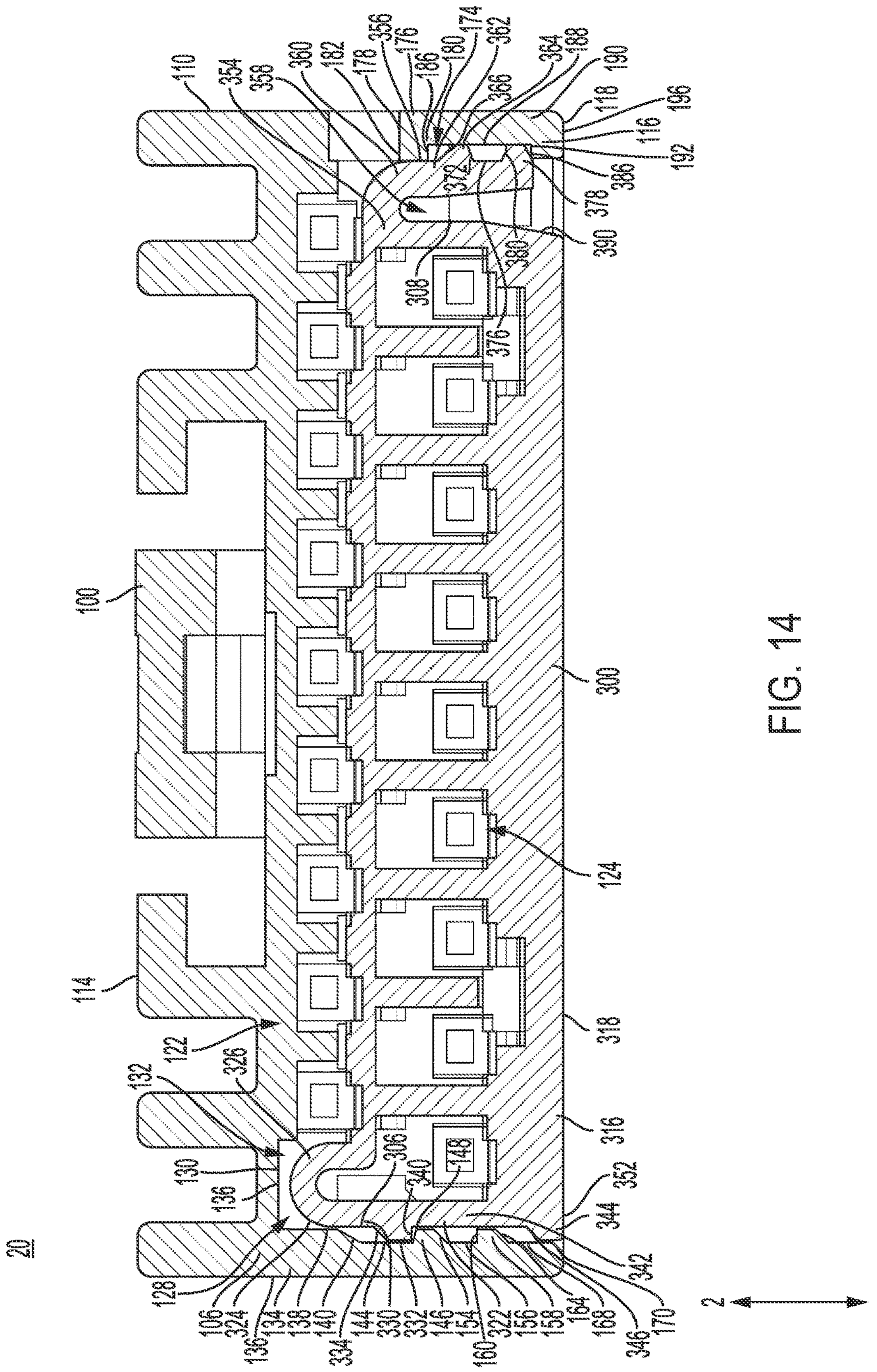
FIG. 14 is a side cross-sectional view of the female connector housing and terminal position assurance member in FIG. 12 along line 14-14.

With reference to FIGS. 13-14, to move TPA member 300 from pre-lock position 10 to final lock position 20, in which TPA member 300 can be entirely disposed within female housing 100, TPA member 300 can be moved upward within TPA member aperture 128 along an axis generally parallel to transverse axis 2. To move TPA member 300 to final lock position 20, after terminal segments are inserted into female housing 100, TPA member 300 can be moved upward into female housing 100 within TPA member aperture 128 toward top end 114 of female housing 100. In some aspects, first locking detent 344 of first lock arm 322 and second locking detent 378 of second lock arm 354 can engage first retention wall 134 and second retention wall 176, respectively, to move TPA member 300 from pre-lock position 10 to final lock position 20, in which TPA member 300 can be disposed fully within female housing 100. The geometry of first retention wall 134, second retention wall 176, first lock arm 322, and second lock arm 354 can support movement of TPA member 300 between pre-lock position 10 and final lock position 20.

In some aspects, top surface 346 of first lock arm 322 first locking detent 344 can pass lower chamfer 170 of first retention wall 134 to move TPA member 300 upward within TPA member aperture 128 along an axis generally parallel to transverse axis 2. In some aspects, top surface 346 of first locking detent 344 can be at bevel angle, n. In some aspects, lower chamfer 170 can be at chamfer angle, ¿. Accordingly, first locking detent 344 can pass lower chamfer 170. In some aspects, top surface 334 of first lock arm 322 first retention detent 332 can pass bottom surface 154 of first retention wall 134 first retention detent 146 to move TPA member 300 upward within TPA member aperture 128. In some aspects, top surface 334 can be at bevel angle, ¿. In some aspects, bottom surface 154 can be at bevel angle, y. Accordingly, first retention detent 332 can pass first retention detent 146.

Figure 12:
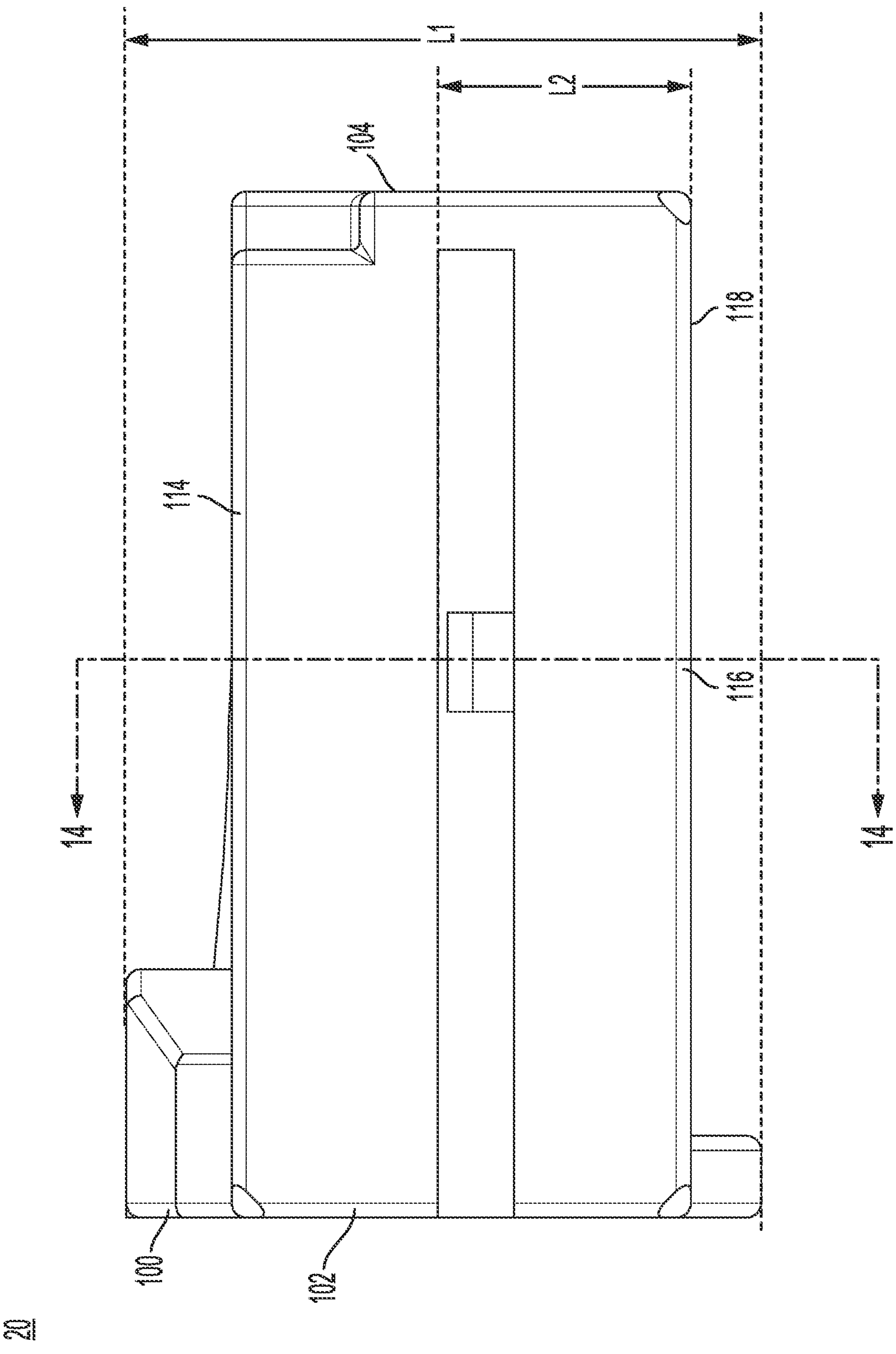
FIG. 12 is a side view of a female connector housing and terminal position assurance member according to various aspects.

Final lock position 20 is shown in FIGS. 12 and 14. With reference to FIG. 14, in an aspect, a thickness L1 of female housing 100 along an axis generally parallel to transverse axis 2 can be larger than a thickness L2 of TPA member 300 in the same direction. Accordingly, TPA member 300 can be received by female housing 100 from pre-lock position 10 (FIGS. 11, 13) to final lock position 20.

As shown in FIG. 14, in final lock position 20, in some aspects, first retention detent 332 can be positioned above first retention detent 146. In some aspects, first locking detent 344 of first lock arm 322 can engage first retention wall 134. In an aspect, first locking detent 344 can be disposed adjacent lower chamfer 170 of first retention wall 134 to retain first locking detent 344 of TPA member 300 in first retention aperture 132.

First lock arm 322 and second lock arm 354 can be moved upward together (e.g., simultaneously) to move TPA member 300 to final lock position 20. In some aspects, top surface 380 of second lock arm 354 second locking detent 378 can pass second locking detent 190 bottom surface 196 of second retention wall 176 to move TPA member 300 upward within TPA member aperture 128 along an axis generally parallel to transverse axis 2. In some aspects, top surface 380 of second locking detent 378 can be at chamfer angle, κ. Accordingly, second lock arm 354 can pass bottom surface 196. In some aspects, second lock arm 354 can be deflected inward away from its biased position to pass bottom surface 196. In some aspects, bottom surface 390 of second side 308 can be at chamfer angle, u. Accordingly, second lock arm 354 can be deflected inward toward second side 308. In some aspects, second lock arm 354 can deflect outward to its biased position after passing second locking detent 190. In final lock position 20, in some aspects, second locking detent 378 of second lock arm 354 can engage second retention wall 176. In an aspect, second locking detent 378 can be disposed between second retention detent 180 and second locking detent 190 of second retention wall 176 to retain second lock arm 354 of TPA member 300 in second retention aperture 174. In an aspect, second retention detent 364 and second locking detent 378 can be disposed between second retention detent 180 and second locking detent 190 of second retention wall 176.

In an aspect, an audible and/or tactile feedback signal (e.g., an audible click sound) can be produced to indicate that TPA member 300 is in final lock position 20 in addition to the visual feedback of the entire TPA member 300 being within female housing 100. This feedback can provide assurance that terminal segments in terminal apertures 120 are installed with reinforcement or secondary locking.

Once in final lock position 20, TPA member 300 can be entirely within female housing 100 such that bottom end 316 of TPA member 300 does not extend below bottom end 116 of female housing 100. In some aspects, bottom surface 318 of TPA member 300 can be aligned with bottom surface 118 of female housing 100, as shown in FIG. 14. Accordingly, visual feedback of TPA member 300 being entirely disposed in female housing 100 can signal that TPA member 300 is in final lock position 20. In an aspect, aperture sidewall 130 of TPA member aperture 128 can prevent further movement of TPA member 300 into female housing 100 such that TPA member 300 provides assurance that final lock position 20 is achieved.

TPA member 300 can be moved downward along an axis generally parallel to transverse axis 2 to reset the assembly of female housing 100 and TPA member 300 to release terminal segments disposed in female housing 100 such that the terminals are disconnected, to facilitate maintenance, for example. In this way, TPA member 300 can return to pre-lock position 10, as shown in FIGS. 11 and 13. To return to pre-lock position 10 from final lock position 20, TPA member 300 can be moved downward away from top end 114 of female housing 100.

Referring again to FIGS. 13-14, to move TPA member 300 from final lock position 20 (FIG. 14) to pre-lock position 10 (FIG. 13), in which TPA member 300 extends outwardly female housing 100, TPA member 300 can be moved downward within TPA member aperture 128 along an axis generally parallel to transverse axis 2. To move TPA member 300 to pre-lock position 10, after terminal segments are inserted into female housing 100, TPA member 300 can be moved downward in female housing 100 within TPA member aperture 128 away from bottom end 116 of female housing 100. In some aspects, first locking detent 344 of first lock arm 322 and second locking detent 378 of second lock arm 354 can disengage first retention wall 134 and second retention wall 176, respectively, to move TPA member 300 from final lock position 20 (FIG. 14) to pre-lock position 10 (FIG. 13), in which TPA member 300 can extend from female housing 100.

In some aspects, first locking detent 344 of first lock arm 322 can pass lower chamfer 170 of first retention wall 134 to move TPA member 300 downward in TPA member aperture 128 along an axis generally parallel to transverse axis 2. In some aspects, lower chamfer 170 can be at chamfer angle, ε. Accordingly, first locking detent 344 can pass lower chamfer 170. In some aspects, bottom surface 340 of first lock arm 322 first retention detent 332 can pass top surface 148 of first retention wall 134 first retention detent 146 to move TPA member 300 downward within TPA member aperture 128. In some aspects, top surface 148 can be at bevel angle, β. Accordingly, first retention detent 332 can pass first retention detent 146.

In pre-lock position 10 shown in FIG. 13, in some aspects, first locking detent 344 of first lock arm 322 can be positioned below first retention wall 134. In some aspects, first retention detent 332 of first lock arm 322 can be disposed between first retention detent 146 and first locking detent 158 to retain TPA member 300 in first retention aperture 132.

First lock arm 322 and second lock arm 354 can be moved downward together (e.g., simultaneously) to move TPA member 300 to pre-lock position 10. In some aspects, second locking detent 378 of second lock arm 354 can pass second locking detent 190 top surface 192 of second retention wall 176 to move TPA member 300 downward in TPA member aperture 128 along an axis generally parallel to transverse axis 2. In some aspects, bottom surface 386 of second locking detent 378 can be at chamfer angle, λ. Accordingly, second locking detent 378 can pass top surface 192. In some aspects, second lock arm 354 can be deflected inward away from its biased position to pass top surface 192. In some aspects, second lock arm 354 can deflect outward to its biased position after passing second locking detent 190. In pre-lock position 10, in some aspects, second locking detent 378 of second lock arm 354 can be below second retention wall 176. In some aspects, second locking detent 190 can be disposed between second retention detent 364 and second locking detent 378. In some aspects, second lock arm 354 can be biased such that second locking detent 190 is disposed between second retention detent 364 and second locking detent 378.

Figure 15:
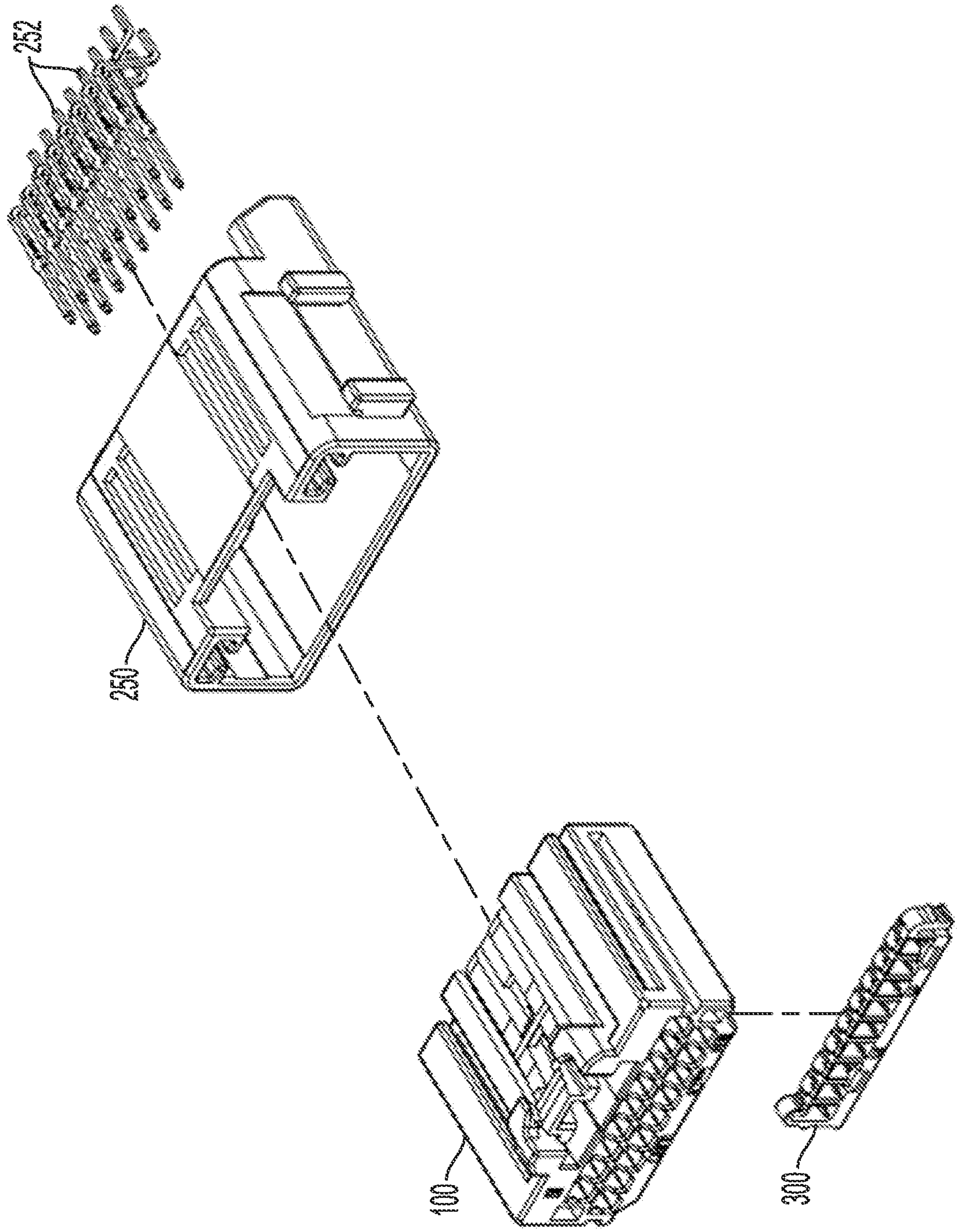
FIG. 15 is an assembly view of an electrical connector according to various aspects.

As shown in FIG. 15, an electrical connector can include female housing 100, TPA member 300, and a male housing 200. Male housing 200 can receive the pre-installed assembly of female housing 100 and TPA member 300 in final lock position 20 (FIG. 14) to couple male housing 200 to female housing 100. In some aspects, male housing 200 can be prevented from receiving the pre-installed assembly of female housing 100 and TPA member 300 if TPA member 300 is in pre-lock position 10 (FIGS. 11, 13) because of the extension outwardly of TPA member 300 from female housing 100. In some aspects, female housing 100, TPA member 300, and male housing 200 can be injection molded plastic. Male housing 200 can additionally support reinforcement tabs 254 and male pins 252.

Figure 16:
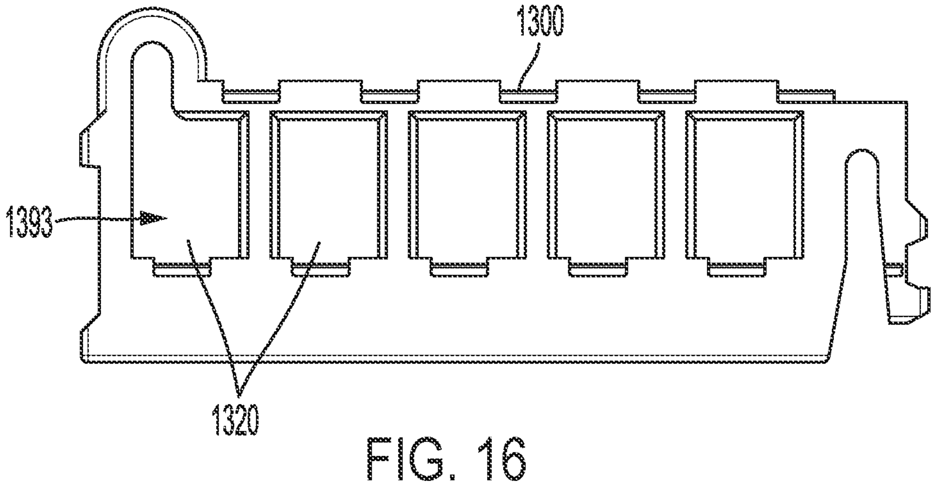
FIG. 16 is a front view of a terminal position assurance member according to various aspects.

A TPA member 1300 according to various aspects is shown in FIG. 16. In some aspects, TPA member 1300 can include similar components as TPA member 300 (FIGS. 7-8). As shown, TPA member 1300 can include one or more terminal apertures 320 as TPA member 300. In some aspects, TPA member 1300 can include fewer terminal apertures 320 than TPA member 300. For example, TPA member 1300 can include approximately five terminal apertures 1320 arranged in terminal aperture row 1393.

Figure 17:
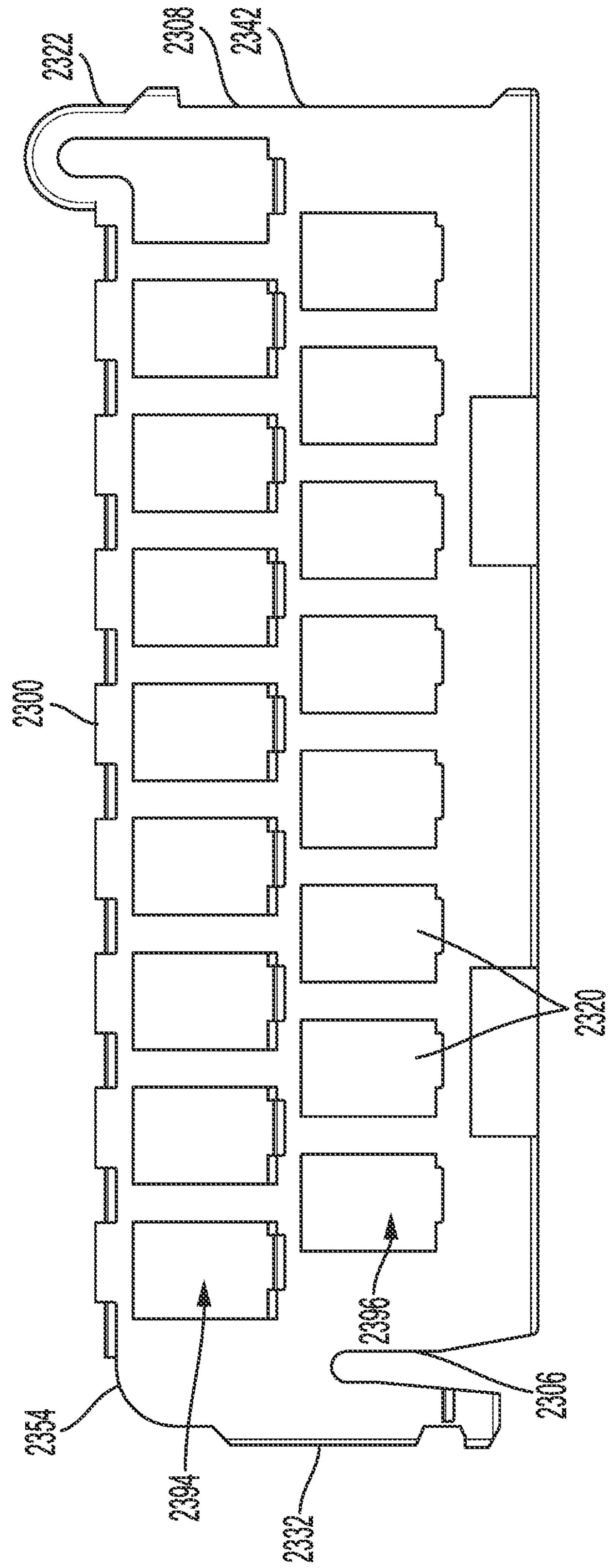
FIG. 17 is a front view of a terminal position assurance member according to various aspects.

A TPA member 2300 according to various aspects is shown in FIG. 17. In some aspects, TPA member 2300 can include similar components as TPA member 300 (FIGS. 7-8) or TPA member 1300 (FIG. 16). As shown, TPA member 2300 can include more than one terminal aperture rows. In some aspects, TPA member 2300 can include a first terminal aperture row 2394 and a second terminal aperture row 2396 in which terminal apertures 2320 are arranged.

In some aspects, first lock arm 2322 can be fixed and second lock arm 2354 can be cantilevered such that TPA member 2300 is asymmetrical. In some aspects, first side 2306 of TPA member 2300 can include second lock arm 2354. In some aspects, second side 2308 can include first lock arm 2322.

In some aspects, intermediate step 2342 of first lock arm 2322 can be elongated in comparison to intermediate step 342 (FIG. 9) of first lock arm 322 (FIG. 9). Accordingly, intermediate step 2342 can cover a greater part of locking surface 2324 in comparison to locking surface 324 (FIG. 9) of first lock arm 322. In some aspects, intermediate step 2342 can extend along second side 2308 adjacent first terminal aperture row 2394 and second terminal aperture row 2396.

In some aspects, retention detent 2332 of second lock arm 2354 can be elongated in comparison to retention detent 364 (FIG. 10) of second lock arm 354 (FIG. 10). Accordingly, retention detent 2332 can cover a greater part of locking surface 2356 than retention detent 364 on locking surface 356 (FIG. 10). In some aspects, retention detent 2332 can extend along first side 2306 adjacent first terminal aperture row 2394 and second terminal aperture row 2396.

Figure 18:
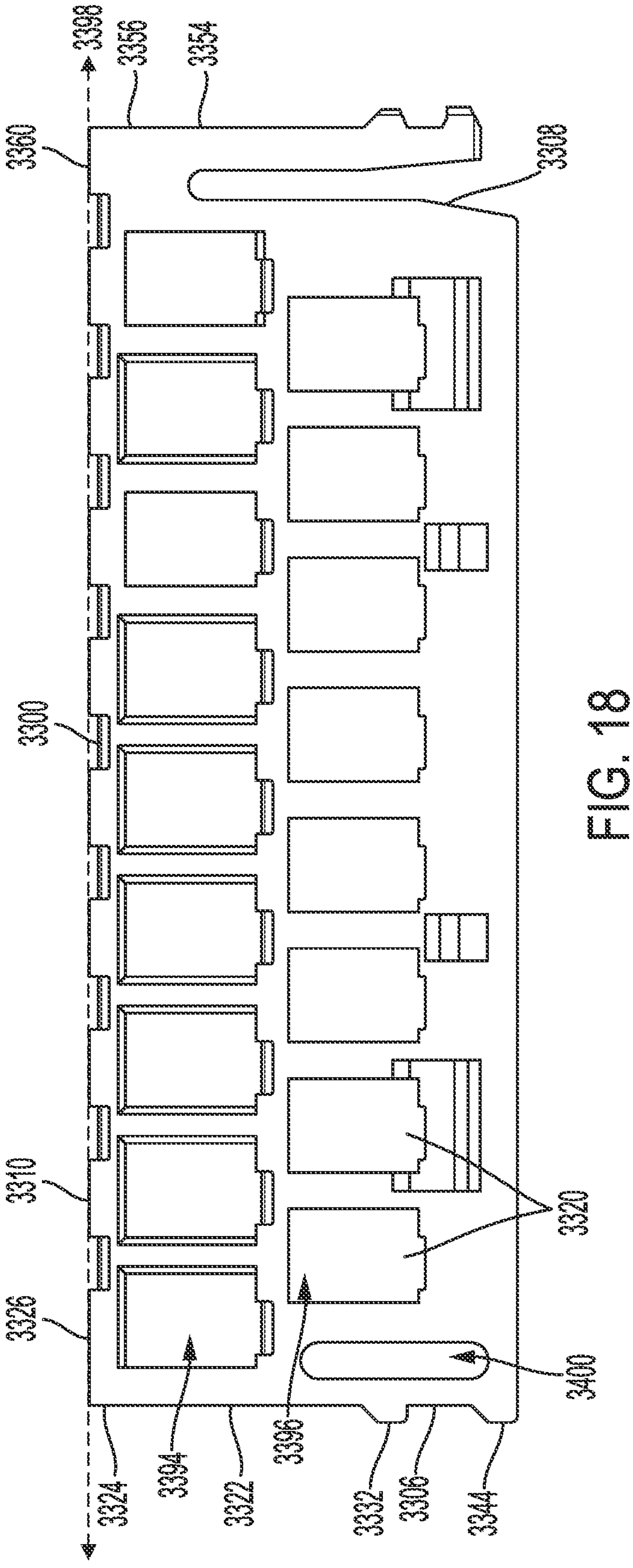
FIG. 18 is a front view of a terminal position assurance member according to various aspects.

A TPA member 3300 according to various aspects is shown in FIG. 18. In some aspects, TPA member 3300 can include similar components as TPA member 300 (FIGS. 7-8), TPA member 1300 (FIG. 16), or TPA member 2300 (FIG. 17). As shown, TPA member 3300 can include more than one terminal aperture rows. In some aspects, TPA member 3300 can include a first terminal aperture row 3394 and a second terminal aperture row 3396 in which terminal apertures 3320 are arranged.

In some aspects, first lock arm 3322 can be fixed and second lock arm 3354 can be cantilevered such that TPA member 3300 is asymmetrical. In some aspects, first side 3306 of TPA member 3300 can include first lock arm 3322. In some aspects, second side 3308 can include second lock arm 3354.

In some aspects, retention detent 3332 and locking detent 3344 of first lock arm 3322 can be along first side 3306 below first terminal aperture row 3394. In some aspects, retention detent 3364 and locking detent 3378 can be along first side 3306 below first terminal aperture row 3394.

As shown, in some aspects, top surface 3326 of first lock arm 3322 can be part of top end 3310 of terminal position assurance member 3300. Accordingly, top surface 3326 does not extend above top end 3310. In an aspect, top surface 3326 can include a flat surface. In an aspect, the interface between top surface 3326 and locking surface 3324 of first lock arm 3322 can be a corner.

In some aspects, top surface 3360 of second lock arm 3354 can be part of top end 3310 of terminal position assurance member 3300. Accordingly, top surface 3326 and top surface 3360 can be aligned along the same axis 3398. In an aspect, top surface 3360 can include a flat surface. In an aspect, the interface between top surface 3360 and locking surface 3356 of second lock arm 3354 can be a corner.

In some aspects, first lock arm 3322 can include an opening 3400 to facilitate flexing of TPA member 3300. As shown, opening 3400 can extend through first lock arm 3322 adjacent locking surface 3324 and below first terminal aperture row 3394.

Figure 19:
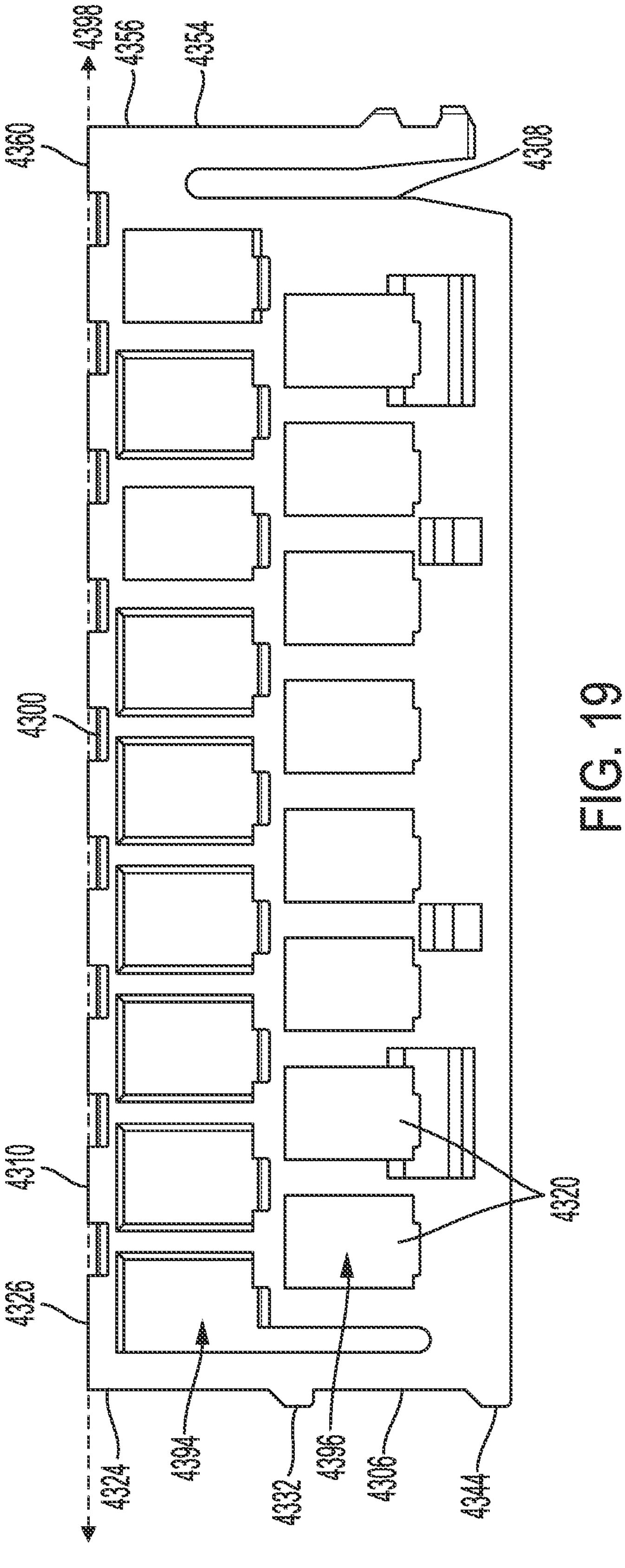
FIG. 19 is a front view of a terminal position assurance member according to various aspects.

A TPA member 4300 according to various aspects is shown in FIG. 19. In some aspects, TPA member 4300 can include similar components as TPA member 300 (FIGS. 7-8), TPA member 1300 (FIG. 16), TPA member 2300 (FIG. 17), or TPA member 3300 (FIG. 18). As shown, TPA member 4300 can include more than one terminal aperture rows. In some aspects, TPA member 4300 can include a first terminal aperture row 4394 and a second terminal aperture row 4396 in which terminal apertures 4320 are arranged.

In some aspects, first lock arm 4322 can be fixed and second lock arm 4354 can be cantilevered such that TPA member 4300 is asymmetrical. In some aspects, first side 4306 of TPA member 4300 can include first lock arm 4322. In some aspects, second side 4308 can include second lock arm 4354.

In some aspects, retention detent 4332 and locking detent 4344 of first lock arm 4322 can be along first side 4306 below first terminal aperture row 4394. In some aspects, retention detent 4364 and locking detent 4378 can be along second side 4308 below first terminal aperture row 4394.

As shown, in some aspects, top surface 4326 of first lock arm 4322 can be part of top end 4310 of terminal position assurance member 4300. Accordingly, top surface 4326 does not extend above top end 4310. In an aspect, top surface 4326 can include a flat surface. In an aspect, the interface between top surface 4326 and locking surface 4324 of first lock arm 4322 can be a corner.

In some aspects, top surface 4360 of second lock arm 4354 can be part of top end 4310 of terminal position assurance member 4300. Accordingly, top surface 4326 and top surface 4360 can be aligned along the same axis 4398. In an aspect, top surface 4360 can include a flat surface. In an aspect, the interface between top surface 4360 and locking surface 4356 of second lock arm 4354 can be a corner.

In some aspects, first lock arm 4322 can include an opening 4400 to facilitate flexing of TPA member 4300. As shown, opening 4400 can extend through first lock arm 4322 adjacent locking surface 4324 and through a terminal aperture 320 of first terminal aperture row 4394. In some aspects, opening 4400 can end above locking detent 4344 and higher on TPA member 4300 than locking detent 4344 (FIG. 18). In some aspects, retention detent 4332 can be positioned higher along first side 4306 in comparison to retention detent 4332 (FIG. 18) to reinforce the flexing portion of first lock arm 4322 where opening 4400 is positioned.

Figure 20:
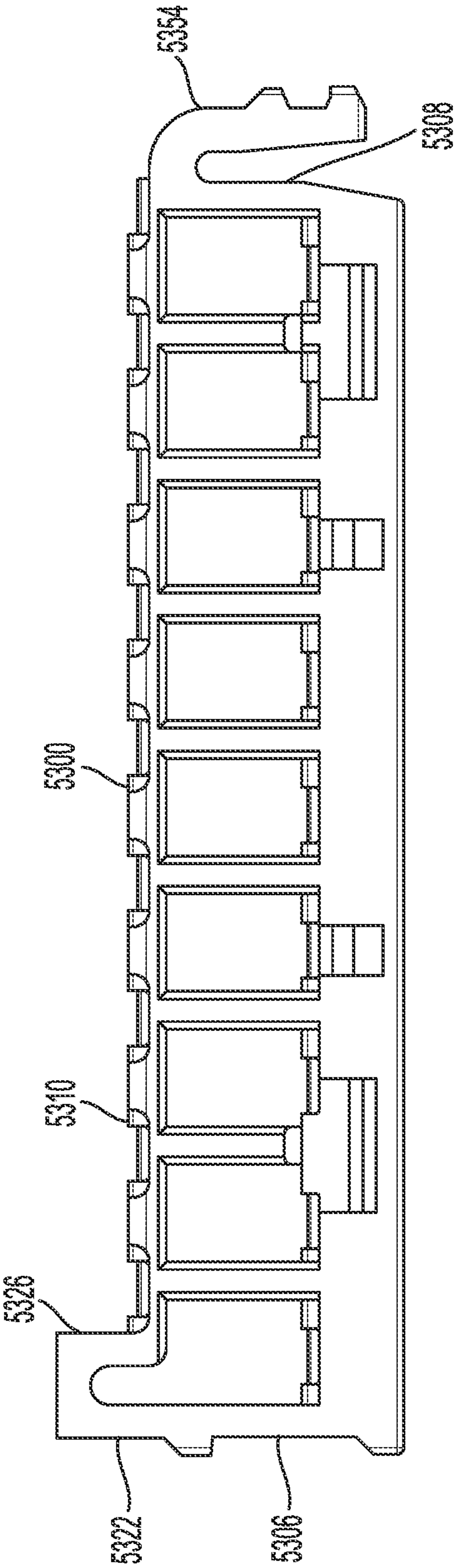
FIG. 20 is a front view of a terminal position assurance member according to various aspects.

A TPA member 5300 according to various aspects is shown in FIG. 20. In some aspects, TPA member 5300 can include similar components as TPA member 300 (FIGS. 7-8), TPA member 1300 (FIG. 16), TPA member 2300 (FIG. 17), TPA member 3300 (FIG. 18), or TPA member 4300 (FIG. 19).

In some aspects, first lock arm 5322 can be fixed and second lock arm 5354 can be cantilevered such that TPA member 5300 is asymmetrical. In some aspects, first side 5306 of TPA member 5300 can include first lock arm 5322. In some aspects, second side 5308 can include second lock arm 5354.

As shown, in some aspects, top surface 5326 can extend outwardly from top end 5310 of TPA member 5300 adjacent first side 5306. In an aspect, top surface 5326 can include a flat surface. In an aspect, the interface between top surface 5326 and locking surface 5324 of first lock arm 5322 can be a corner.

Figure 21:
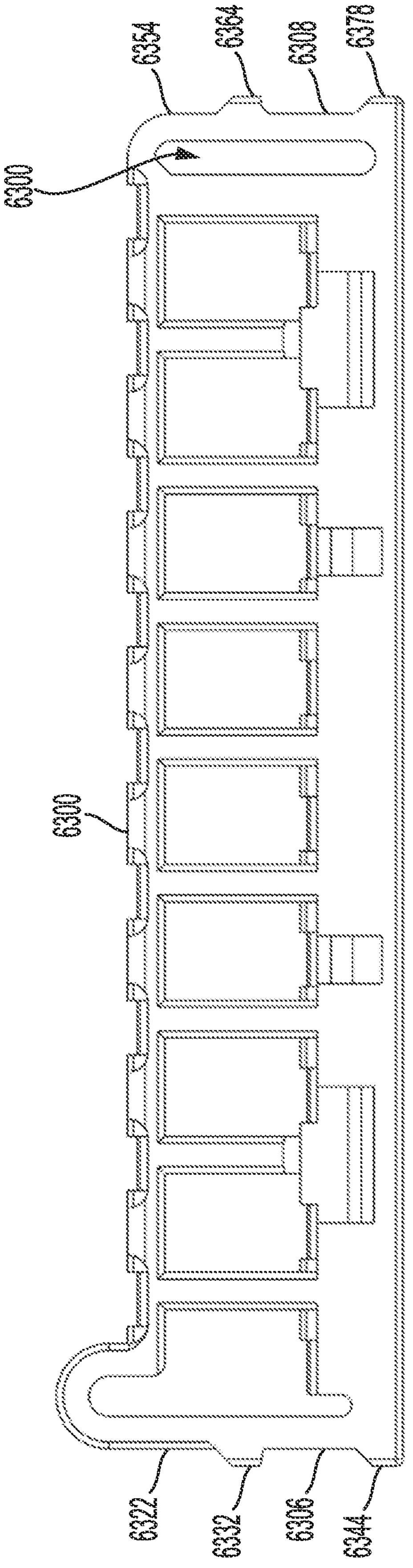
FIG. 21 is a front view of a terminal position assurance member according to various aspects.
Figure 22:
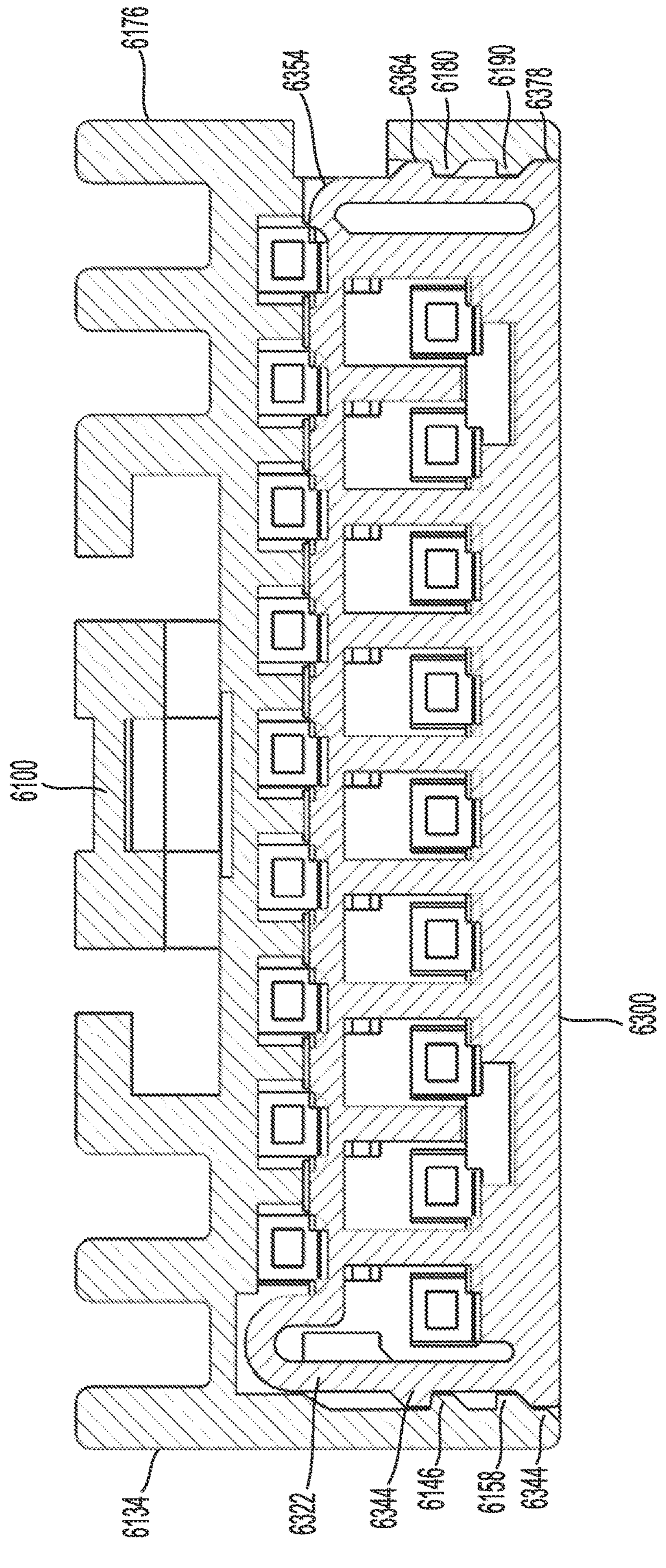
FIG. 22 is a side cross-sectional view of a female connector housing and the terminal position assurance member of FIG. 21.

A TPA member 6300 according to various aspects is shown in FIGS. 21 and 22. In some aspects, TPA member 6300 can include similar components as TPA member 300 (FIGS. 7-8), TPA member 1300 (FIG. 16), TPA member 2300 (FIG. 17), TPA member 3300 (FIG. 18), or TPA member 4300 (FIG. 19).

In some aspects, first side 6306 of TPA member 6300 can include first lock arm 6322. In some aspects, second side 6308 of TPA member 6300 can include second lock arm 6354. In some aspects, both of first lock arm 6322 and and second lock arm 6354 can be fixed, such that they cannot be cantilevered. In some aspects, second lock arm 6354 can be fixed with an enclosed aperture 6358, which allows second lock arm 6354 to deform inwardly to move from pre-lock position 10 to lock position 20.

In some aspects, retention detents and locking detents of TPA member 6300 can arranged be in line, such that they are at same vertical height. For example, as shown in FIG. 21, in some aspects, first retention detent 6332 of first lock arm 6322 and retention detent 6364 of second lock arm 6354 can be at the same vertical height. Also, in some aspects, first locking detent 6344 of first lock arm 6322 and second locking detent 6378 of second lock arm 6354 can be at the same vertical height. In some aspects, with retention detents and locking detents arranged in line, first lock arm 6322 and second lock arm 6354 can have symmetrical shapes. In some aspects, with retention detents and locking detents arranged in line, first lock arm 6322 and second lock arm 6354 can have asymmetrical shapes.

As shown in FIG. 22, in some aspects, retention detents and locking detents of a corresponding female housing 6100 can also be in line, such that they are at same vertical height. For example, in some aspects, first retention detent 6146 of first retention wall 6134 and second retention detent 6180 of second retention wall 6176 can be at the same vertical height. Also, in some aspects, first locking detent 6158 of first retention wall 6134 and second locking detent 6190 of second retention wall 6176 can be at the same vertical height.

In some aspects, arranging retention detents and locking detents in line allows force to be equally distributed in TPA member 6300 and female housing 6100.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. An electrical connector housing to receive an asymmetrical terminal position assurance member comprising:
- a first side;
- a second side opposing the first side;
- a first retention aperture configured to receive a fixed lock arm of the terminal position assurance member; and
- a first retention wall extending from the first side and adjacent the first retention aperture, the first retention wall comprising:
  - a first retention detent and a first locking detent positioned below the first retention detent, the first retention detent and the first locking detent extending outwardly from the first retention wall and configured to retain the fixed lock arm in the first retention aperture; and an intermediate step comprising a shaped surface above the first retention detent, the intermediate step configured to receive a first retention detent of the fixed lock arm in a final lock position of the terminal position assurance member.

2. The electrical connector housing of claim 1, wherein the first retention wall further comprises an second intermediate step between the first retention detent and the first locking detent to receive a first retention detent of the fixed lock arm in a pre-lock position of the terminal position assurance member.

3. The electrical connector housing of claim 1, further comprising a first row of terminal apertures and a second row of terminal apertures positioned below the first row, the first row and the second row separated by a row axis, wherein the intermediate step is positioned above the row axis.

4. The electrical connector housing of claim 3, wherein the first retention detent and the first locking detent are positioned below the row axis.

5. The electrical connector housing of claim 1, further comprising a second retention aperture to receive a cantilevered lock arm of the terminal position assurance member and a second retention wall extending from the second side and adjacent the second retention aperture.

6. The electrical connector housing of claim 5, wherein the first retention wall further comprises a first top surface, wherein the second retention wall comprises a second surface, and wherein the first top surface is positioned above the second surface.

7. The electrical connector housing of claim 5, wherein the second retention wall comprises a second retention detent and a second locking detent positioned below the second retention detent, the second retention detent and the second locking detent extending outwardly from the second retention wall to retain the cantilevered lock arm in the second retention aperture.

8. A terminal position assurance member comprising:

a front;

a rear opposing the front;

a side intermediate to the front and the rear;

a top end intermediate to the front and the rear;

a fixed lock arm configured to retain the terminal position assurance member in a first retention aperture of an electrical connector housing, the fixed lock arm being fixed at both ends and extending outwardly from the top end; and a cantilevered lock arm configured to retain the terminal position assurance member in a second retention aperture of the electrical connector housing, the cantilevered lock arm being fixed at one end and extending downwardly from the top end and outwardly from the side such that the terminal position assurance member is asymmetrical.

9. The terminal position assurance member of claim 8, wherein the fixed lock arm comprises a first retention detent and a first locking detent positioned below the first retention detent, the first retention detent and the first locking detent being received by a first retention wall of the electrical connector housing.

10. The terminal position assurance member of claim 8, wherein the fixed lock arm comprises a curved top surface.

11. The terminal position assurance member of claim 8, wherein a top surface of the fixed lock arm is part of the top end of the terminal position assurance member.

12. The terminal position assurance member of claim 8, wherein the fixed lock arm extends outwardly from the top end of the terminal position assurance member.

13. The terminal position assurance member of claim 8, wherein the distance from a bottom surface of the terminal position assurance member to the top end of the terminal position assurance member is less than the distance from the bottom surface of the terminal position assurance member to a top surface of the fixed lock arm.

14. The terminal position assurance member of claim 8, wherein D7 is the distance from a bottom surface of the terminal position assurance member to the top end of the terminal position assurance member, and wherein D8 is the distance from the bottom surface of the terminal position assurance member to a top surface of the fixed lock arm, and wherein D8 is greater than D7.

15. The terminal position assurance member of claim 8, wherein the cantilevered lock arm is deflected inward toward the side of the terminal position assurance member to move between a pre-lock position and a final lock position of the terminal position assurance member.

16. A method of retaining a terminal position assurance member in an electrical connector, the method comprising:

providing a first row of terminal apertures and a second row of terminal apertures below the first row, the first row and the second row being disposed between a first side and a second side of a housing, the second side opposing the first side;

providing an aperture to receive a terminal position assurance member, the aperture extending upward from a bottom of the housing and comprising a first retention aperture intermediate to the first side and the first row and the second row and a second retention aperture intermediate to the second side and the first row and the second row;

receiving a fixed lock arm of the terminal position assurance member in the first retention aperture; and receiving a cantilevered lock arm of the terminal position assurance member in the second retention aperture, wherein the cantilevered lock arm is fixed at one end and extends downwardly from a top end of the terminal position assurance member and outwardly from a side of the terminal position assurance member.

17. The method of claim 16, further comprising offsetting the first row such that the first row begins at a distance D1 from a first side of the first side of the housing, the distance D1 being greater than a distance D2 from the first side, the second row beginning at the distance D2.

18. The method of claim 17, wherein the first row begins at a distance D3 from a second side of the second side of the housing, the distance D3 being less than a distance D4 from the second side, the second row beginning at the distance D4.

19. The method of claim 16, wherein the first row and the second row separated by a row axis, wherein receiving the fixed lock arm of the terminal position assurance member in the first retention aperture comprises extending the fixed lock arm above the row axis, and wherein receiving the cantilevered lock arm of the terminal position assurance member in the second retention aperture comprises extending the cantilevered lock arm to the same level as the row axis.

* * * * *